US009934266B2

(12) United States Patent
Wright et al.

(10) Patent No.: US 9,934,266 B2
(45) Date of Patent: Apr. 3, 2018

(54) MEMORY-EFFICIENT COMPUTER SYSTEM FOR DYNAMIC UPDATING OF JOIN PROCESSING

(71) Applicant: Walleye Software, LLC, Plymouth, MN (US)

(72) Inventors: Charles Wright, Cortlandt Manor, NY (US); Ryan Caudy, New York, NY (US); David R. Kent, IV, Colorado Springs, CO (US); Mark Zeldis, Randolph, NJ (US); Raffi Basralian, New York, NY (US); Radu Teodorescu, New York, NY (US)

( * ) Notice: Subject to any disclaimer, the term of this patent is extended or adjusted under 35 U.S.C. 154(b) by 0 days.

(21) Appl. No.: 15/154,993

(22) Filed: May 14, 2016

(65) Prior Publication Data

US 2016/0335334 A1 Nov. 17, 2016

Related U.S. Application Data

(60) Provisional application No. 62/161,813, filed on May 14, 2015.

(51) Int. Cl.
G06F 17/30 (2006.01)
G06F 3/0482 (2013.01)
(Continued)

(52) U.S. Cl.
CPC ...... *G06F 17/30368* (2013.01); *G06F 3/0481* (2013.01); *G06F 3/0482* (2013.01); *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01);
(Continued)

(58) Field of Classification Search
CPC ......... G06F 17/30563; G06F 17/30516; G06F 17/30498; G06F 11/1072
USPC .................................................. 707/705–780
See application file for complete search history.

(56) References Cited

U.S. PATENT DOCUMENTS

| 5,335,202 A | 8/1994 | Manning et al. |
| 5,452,434 A | 9/1995 | Macdonald |

(Continued)

FOREIGN PATENT DOCUMENTS

| CA | 2309462 A1 | 12/2000 |
| EP | 1406463 A2 | 4/2004 |

(Continued)

OTHER PUBLICATIONS

"IBM Informix TimeSeries data management", dated Jan. 18, 2016. Retrieved from https://web.archive.org/web/20160118072141/ http://www-01.ibm.com/software/data/informix/timeseries/.
(Continued)

*Primary Examiner* — Anh Tai Tran
(74) *Attorney, Agent, or Firm* — Carmichael IP, PLLC

(57) ABSTRACT

Described are methods, systems and computer readable media for dynamically updating join operation results in a computer system. A memory-efficient computer system for dynamically updating join operation results may include multiple memory devices having different access times. A computer system for dynamically updating join operation results in real time may re-apply a join operation based on a communication received over a network interface device.

40 Claims, 18 Drawing Sheets

(51) Int. Cl.

| | | |
|---|---|---|
| *G06F 3/0489* | (2013.01) | |
| *G06F 17/22* | (2006.01) | |
| *G06F 17/24* | (2006.01) | |
| *G06F 17/27* | (2006.01) | |
| *G06F 12/084* | (2016.01) | |
| *H04L 12/58* | (2006.01) | |
| *G06F 15/173* | (2006.01) | |
| *G06F 3/0481* | (2013.01) | |
| *G06F 3/0484* | (2013.01) | |
| *G06F 3/0485* | (2013.01) | |
| *G06F 12/02* | (2006.01) | |
| *G06F 9/44* | (2018.01) | |
| *G06F 9/45* | (2006.01) | |
| *H04L 29/08* | (2006.01) | |
| *G06F 3/06* | (2006.01) | |
| *G06F 11/14* | (2006.01) | |
| *H04L 29/06* | (2006.01) | |
| *G06F 9/445* | (2018.01) | |
| *H04L 12/18* | (2006.01) | |
| *H04L 29/12* | (2006.01) | |

(52) U.S. Cl.
CPC ............... *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 15/17331* (2013.01); *G06F 17/2235* (2013.01); *G06F 17/24* (2013.01); *G06F 17/246* (2013.01); *G06F 17/276* (2013.01); *G06F 17/2715* (2013.01); *G06F 17/30117* (2013.01); *G06F 17/30312* (2013.01); *G06F 17/30315* (2013.01); *G06F 17/30321* (2013.01); *G06F 17/30324* (2013.01); *G06F 17/30327* (2013.01); *G06F 17/30333* (2013.01); *G06F 17/30336* (2013.01); *G06F 17/30339* (2013.01); *G06F 17/30345* (2013.01); *G06F 17/30371* (2013.01); *G06F 17/30374* (2013.01); *G06F 17/30377* (2013.01); *G06F 17/30398* (2013.01); *G06F 17/30424* (2013.01); *G06F 17/30448* (2013.01); *G06F 17/30454* (2013.01); *G06F 17/30477* (2013.01); *G06F 17/30522* (2013.01); *G06F 17/30528* (2013.01); *G06F 17/30554* (2013.01); *G06F 17/30563* (2013.01); *G06F 17/30584* (2013.01); *G06F 17/30598* (2013.01); *G06F 17/30864* (2013.01); *G06F 17/30867* (2013.01); *G06F 17/30887* (2013.01); *G06F 17/30958* (2013.01); *G06F 17/30997* (2013.01); *H04L 12/18* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/34* (2013.01); *H04L 67/42* (2013.01); *H04L 69/16* (2013.01); *G06F 2201/805* (2013.01); *G06F 2201/84* (2013.01); *G06F 2212/60* (2013.01)

(56) References Cited

U.S. PATENT DOCUMENTS

| | | |
|---|---|---|
| 5,469,567 A | 11/1995 | Okada |
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,428 A | 7/1998 | Hart |
| 5,806,059 A | 9/1998 | Tsuchida et al. |
| 5,859,972 A | 1/1999 | Subramaniam et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 * | 1/2003 | On Au ............... G06F 17/30489 |
| 6,505,241 B2 | 1/2003 | Pitts |
| 6,510,551 B1 | 1/2003 | Miller |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |

(56) References Cited

U.S. PATENT DOCUMENTS

| | | |
|---|---|---|
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,529,734 B2 | 5/2009 | Dirisala |
| 7,529,750 B2 | 5/2009 | Bair |
| 7,542,958 B1 | 6/2009 | Warren et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,631,034 B1 | 1/2014 | Peloski |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,195,712 B2 | 11/2015 | Freedman et al. |
| 9,298,768 B2 | 3/2016 | Varakin et al. |
| 9,311,357 B2 * | 4/2016 | Ramesh ............ G06F 17/30457 |
| 9,372,671 B2 | 6/2016 | Balan et al. |
| 9,384,184 B2 | 7/2016 | Cervantes et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0208484 A1 * | 11/2003 | Chang ............ G06F 17/30463 |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0076155 A1 | 4/2004 | Yajnik et al. |

(56) References Cited

U.S. PATENT DOCUMENTS

| | | |
|---|---|---|
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0165866 A1 | 7/2005 | Bohannon et al. |
| 2005/0198001 A1 | 9/2005 | Cunningham et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dellinger et al. |
| 2006/0116999 A1 | 6/2006 | Dettinger et al. |
| 2006/0136361 A1 | 6/2006 | Peri et al. |
| 2006/0173693 A1 | 8/2006 | Arazi |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0169003 A1 | 7/2007 | Branda et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0046804 A1 | 2/2008 | Rui |
| 2008/0072150 A1 | 3/2008 | Chan et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0037391 A1 | 2/2009 | Agrawal et al. |
| 2009/0055370 A1 | 2/2009 | Dagum et al. |
| 2009/0083215 A1* | 3/2009 | Burger ............... G06F 17/30536 |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0036801 A1 | 2/2010 | Pirvali et al. |
| 2010/0047760 A1 | 2/2010 | Best et al. |
| 2010/0049715 A1 | 2/2010 | Jacobsen et al. |
| 2010/0161555 A1* | 6/2010 | Nica ............... G06F 17/30383 707/624 |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1* | 6/2011 | Adiba ............... G06F 17/30548 707/737 |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0314019 A1 | 12/2011 | Peris |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1* | 8/2012 | Fauser ............... G06F 17/30286 707/714 |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1* | 7/2013 | Chen ............... G06F 17/30463 707/718 |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0040203 A1 | 2/2014 | Lu et al. |
| 2014/0059646 A1 | 2/2014 | Hannel et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0359574 A1 | 12/2014 | Beckwith et al. |
| 2014/0372482 A1 | 12/2014 | Martin et al. |
| 2014/0380051 A1 | 12/2014 | Edward et al. |

(56) References Cited

U.S. PATENT DOCUMENTS

| | | |
|---|---|---|
| 2015/0019516 A1 | 1/2015 | Wein et al. |
| 2015/0026155 A1 | 1/2015 | Martin |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0127599 A1 | 5/2015 | Schiebeler |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0254298 A1 | 9/2015 | Bourbonnais et al. |
| 2015/0304182 A1 | 10/2015 | Brodsky et al. |
| 2015/0317359 A1* | 11/2015 | Tran .................. G06F 17/30345 707/718 |
| 2016/0026442 A1 | 1/2016 | Chhaparia |
| 2016/0065670 A1 | 3/2016 | Kimmel et al. |
| 2016/0125018 A1 | 5/2016 | Tomoda et al. |
| 2016/0253294 A1 | 9/2016 | Allen et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| RU | 2421798 | 6/2011 |
| WO | 2011120161 A1 | 10/2011 |
| WO | 2012136627 A1 | 10/2012 |
| WO | WO-2014026220 A1 | 2/2014 |
| WO | 2014143208 A1 | 9/2014 |

OTHER PUBLICATIONS

"IBM—What is HBase?", dated Sep. 6, 2015. Retrieved from https://web.archive.org/web/20150906022050/http://www-01.ibm.com/software/data/infosphere/hadoop/hbase/.

"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.

"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.

"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.

"Sophia Database—Architecture", dated Jan. 18, 2016. Retrieved from https://web.archive.org/web/20160118052919/http://sphia.org/architecture.html.

"Google Protocol RPC Library Overview", dated Apr. 27, 2016. Retrieved from https://cloud.google.com/appengine/docs/python/tools/protorpc/ (last accessed Jun. 16, 2016).

"Maximize Data Value with Very Large Database Management by SAP® Sybase® IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.

"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.

"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsight.simport.doc/doc/data_warehouse_sqoop.html.

"GNU Emacs Manual", dated Apr. 15, 2016, pp. 43-47. Retrieved from https://web.archive.org/web/20160415175915/http://www.gnu.org/software/emacs/manual/html_mono/emacs.html.

"Oracle® Big Data Appliance—Software User's Guide", dated Feb. 2015. Retrieved from https://docs.oracle.com/cd/E55905_01/doc.40/e55814.pdf.

"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).

"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).

Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).

Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).

Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlight-ing-087850.html (last accessed Jun. 16, 2016).

Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.

Ex Parte Quayle Action mailed Aug. 8, 2016, in U.S. Appl. No. 15/154,999.

Final Office Action dated Dec. 19, 2016, in U.S. Appl. No. 15/154,995.

International Search Report and Written Opinion dated Aug. 18, 2016, in International Appln. No. PCT/US2016/032582 filed May 14, 2016.

International Search Report and Written Opinion dated Aug. 18, 2016, in International Appln. No. PCT/US2016/032584 filed May 14, 2016.

International Search Report and Written Opinion dated Aug. 18, 2016, in International Appln. No. PCT/US2016/032588 filed May 14, 2016.

International Search Report and Written Opinion dated Aug. 18, 2016, in International Appln. No. PCT/US2016/032593 filed May 14, 2016.

International Search Report and Written Opinion dated Aug. 18, 2016, in International Appln. No. PCT/US2016/032597 filed May 14, 2016.

International Search Report and Written Opinion dated Aug. 18, 2016, in International Appln. No. PCT/US2016/032599 filed May 14, 2016.

International Search Report and Written Opinion dated Aug. 18, 2016, in International Appln. No. PCT/US2016/032605 filed May 14, 2016.

International Search Report and Written Opinion dated Aug. 25, 2016, in International Appln. No. PCT/US2016/032590 filed May 14, 2016.

International Search Report and Written Opinion dated Aug. 25, 2016, in International Appln. No. PCT/US2016/032592 filed May 14, 2016.

International Search Report and Written Opinion dated Aug. 4, 2016, in International Appln. No. PCT/US2016/032581 filed May 14, 2016.

International Search Report and Written Opinion dated Jul. 28, 2016, in International Appln. No. PCT/US2016/032586 filed May 14, 2016.

International Search Report and Written Opinion dated Jul. 28, 2016, in International Appln. No. PCT/US2016/032587 filed May 14, 2016.

(56) References Cited

OTHER PUBLICATIONS

International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Mallet, "Relational Database Support for Spatio-Temporal Data", Technical Report TR 04-21, Sep. 2004, University of Alberta, Department of Computing Science.
Non-final Office Action dated Aug. 12, 2016, in U.S. Appl. No. 15/155,001.
Non-final Office Action dated Aug. 19, 2016, in U.S. Appl. No. 15/154,991.
Non-final Office Action dated Aug. 25, 2016, in U.S. Appl. No. 15/154,980.
Non-final Office Action dated Aug. 26, 2016, in U.S. Appl. No. 15/154,995.
Non-final Office Action dated Aug. 8, 2016, in U.S. Appl. No. 15/154,983.
Non-final Office Action dated Aug. 8, 2016, in U.S. Appl. No. 15/154,985.
Non-final Office Action dated Nov. 17, 2016, in U.S. Appl. No. 15/154,999.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Dec. 19, 2016, in U.S. Appl. No. 15/155,001.
Final Office Action dated Jan. 27, 2017, in U.S. Appl. No. 15/154,980.
Final Office Action dated Jan. 31, 2017, in U.S. Appl. No. 15/154,996.
Murray, Derek G. et al. "Naiad: a timely dataflow system." SOSP '13 Proceedings of the Twenty-Fourth ACM Symposium on Operating Systems Principles. pp. 439-455. Nov. 2013.
Notice of Allowance dated Dec. 22, 2016, in U.S. Appl. No. 15/155,011.
Notice of Allowance dated Feb. 1, 2017, in U.S. Appl. No. 15/154,988.
Notice of Allowance dated Jan. 30, 2017, in U.S. Appl. No. 15/154,987.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Notice of Allowance dated Dec. 7, 2016, in U.S. Appl. No. 15/154,985.
Notice of Allowance dated Nov. 17, 2016, in U.S. Appl. No. 15/154,991.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
"Change Data Capture", Oracle Database Online Documentation 11g Release 1 (11.1), dated Apr. 5, 2016. Retreived from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.
"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.

(56) References Cited

OTHER PUBLICATIONS

Borror, Jefferey A. "Q for Mortals 2.0", dated Nov. 1, 2011. Retreived from http://code.kx.com/wiki/JB:QforMortals2/contents.
Gai, Lei et al. "An Efficient Summary Graph Driven Method for RDF Query Processing", dated Oct. 27, 2015. Retreived from http://arxiv.org/pdf/1510.07749.pdf.
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.pdf.
Advisory Action dated Apr. 20, 2017, in U.S. Appl. No. 15/154,980.
Advisory Action dated Apr. 6, 2017, in U.S. Appl. No. 15/154,995.
Advisory Action dated Apr. 2017, in U.S. Appl. No. 15/154,999.
Advisory Action dated Mar. 31, 2017, in U.S. Appl. No. 15/154,996.
Corrected Notice of Allowability dated Mar. 10, 2017, in U.S. Appl. No. 15/154,979.
Final Office Action dated Apr. 10, 2017, in U.S. Appl. No. 15/155,006.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 4, 2017, in U.S. Appl. No. 15/155,009.
Non-final Office Action dated Apr. 19, 2017, in U.S. Appl. No. 15/154,974.
Non-final Office Action dated Feb. 8, 2017, in U.S. Appl. No. 15/154,997.
Non-final Office Action dated Mar. 2, 2017, in U.S. Appl. No. 15/154,984.
Notice of Allowance dated Feb. 14, 2017, in U.S. Appl. No. 15/154,979.
Notice of Allowance dated Feb. 28, 2017, in U.S. Appl. No. 15/154,990.
Notice of Allowance dated Mar. 2, 2017, in U.S. Appl. No. 15/154,998.
Notice of Allowance dated Mar. 31, 2017, in U.S. Appl. No. 15/154,998.
Notice of Allowance dated May 10, 2017, in U.S. Appl. No. 15/154,988.

\* cited by examiner

MEMORY-EFFICIENT COMPUTER SYSTEM FOR DYNAMIC UPDATING OF JOIN PROCESSING

This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to memory-efficient methods, systems and computer readable media for the dynamic updating of join operations.

Joining two tables to create a third table has historically required combining large sets of data that can tax even large local memory stores and fast processors. Also, standard joins may not provide a user with the desired results. Also, standard joins may require combining large sets of data again after a small change to one of the joined tables to update the result.

Embodiments were conceived in light of the above mentioned needs, problems and/or limitations, among other things.

Some embodiments may include a memory-efficient computer system for dynamically updating join operation results. The system may include a processor, a slow-speed or medium-speed memory device electronically storing at least a portion of a first original table, a slow-speed or medium-speed memory device electronically storing at least a portion of a second original table, a fast-speed memory device electronically storing a join results index resulting from a join operation performed by the processor on the first and second original tables, a notification listener device associated with the join results index in the fast-speed memory device, and computer readable storage coupled to the processor, the computer readable storage having stored thereon instructions that, when executed by the processor, cause the processor to perform operations. The operations may include using the notification listener device to listen for changes to the first and second original tables, automatically notifying the notification listener device of a change to one or both of the first and second original tables, and, in response to the notification listener device receiving notification of a change to one or both of the first and second original tables, automatically re-applying the join operation to changed portions of the original tables. The system may, without user intervention, automatically update in real time the join results index stored in the fast-speed memory device with the results of the automatically re-applying, thereby dynamically updating results of the join operation in the fast-speed memory while minimizing access to the slow-speed memory and the medium-speed memory. The join operation may be reapplied only to changed portions of the original tables and not to unchanged portions. The data in one or both of the first and second original tables may be stored in strict order, such as by timestamp. The join operation may involve one or more original tables in addition to the first and second original tables. The join operation may be reapplied to other tables in addition to the first and second original tables.

Some embodiments may include a computer system for dynamically updating join operation results in real time. The system may comprise a processor, a first memory device electronically storing at least a portion of a first original table, a second memory device electronically storing at least a portion of a second original table, a third memory device electronically storing a join results index resulting from a join operation performed by the processor on the first and second original tables, and computer readable storage coupled to the processor, the computer readable storage having stored thereon instructions that, when executed by the processor, cause the processor to perform operations. The operations may include receiving a communication over a network interface device during a clock cycle, re-applying the join operation during the clock cycle responsive to receiving the communication, and updating the join results index during the clock cycle responsive to the re-applying, thereby dynamically updating results of the join operation in real time to reflect information contained in the communication received over the network interface device. The clock cycle lasts no more than one second, preferably no more than one-tenth of a second, and most preferably no more than ten milliseconds. The clock cycle may be a logical clock cycle and may include multiple processor clock cycles. The first and second original tables my store data in strict order, such as by timestamps. The first and second memory devices may be slow or medium speed memory devices. The third memory device may be a fast speed memory device. The join application may be applied or re-applied directly to data received over the network interface device, without first storing the received data in slow speed memory.

The operations can include wherein the join-based query is a left_join resulting in a table that has one column for each of a plurality of columns in a first input table's columns, and one or more new corresponding second input table columns with names that do not overlap or are renamed in order to not overlap with a name of one or more columns from a first input table. The operations can also include the one or more new columns containing an aggregation of all values from the second input table that match a join criteria. The operations can further include the types of all newly created second input table columns not involved in the join criteria being an array of the second input table's column type.

The operations can include wherein the join-based query is an as_of_join resulting in a table that has one column for each of a plurality of columns in a first input table's columns, and one or more new corresponding second input table columns with names that do not overlap or are renamed in order to not overlap with a name of one or more columns from a first input table. The operations can also include the one or more new columns containing all values from the second input table that match a join criteria, the join criteria performing an exact match on N-1 match columns followed by performing a closest-less-than match on the last match column.

The operations can include wherein the join-based query is a reverse_as_of_join resulting in a table that has one column for each of a plurality of columns in a first input table's columns, and one or more new corresponding second input table columns with names that do not overlap or are renamed in order to not overlap with a name of one or more columns from a first input table. The operations can also include the one or more new columns containing all values from the input table that match a join criteria, the join criteria performing an exact match on N-1 match columns followed by performing a closest-greater-than match on the last match column.

The operations can include wherein the join-based query is a range_as_of_join resulting in a table that has one column for each of a plurality of columns in a first input table's columns, and one or more new corresponding second input table columns with names that do nor overlap or are renamed in order to not overlap with a name of one or more columns from a first input table. The operations can also include the one or more new columns containing all values from the input table that match a join criteria, the join criteria returning each cell in the one or more new columns with an array of all values within a designated range for N-M match columns where the match is exact, and NI match columns define a range match.

The operations can include wherein the join-based query is a natural_join resulting in a table that has one column for each of a plurality of columns in a first input table's columns, and one or more new corresponding second input table columns with names that do not overlap or are renamed in order to not overlap with a name of one or more columns from a first input table. The operations can also include the table having a same number of rows as the source table, the same number of rows containing an original content of the source table rows. The operations can further include the one or more new columns determined by matching one or more values from the input table with the source table.

The operations can include wherein the join-based query is an exact_join resulting in a table that has one column for each of a plurality of columns in a first input table's columns, and one or more new corresponding second input table columns with names that do not overlap or are renamed in order to not overlap with a name of one or more columns from a first input table. The operations can also include the table having a same number of rows as the source table, the same number of rows containing an original content of the source table rows, The operations can further include the one or more new columns determined by matching one or more values from the input table with the source table. The operations can also include the table containing exactly one match for each row with the input table.

The operations can include wherein the join-based query creates a subset filtered by a match criteria on a full Cartesian product, resulting in a table that has one column for each of a plurality of columns in a first input table's columns, and one or more new corresponding second input table columns with names that do not overlap or are renamed in order to not overlap with a name of one or more columns from a first input table.

The operations can include wherein the join operation node is different than the join operation results node.

The operations can include wherein the real-time merged notification listener for the join operation node is separate from the join operation node.

The operations can include wherein the real-time merged notification listener for the join operation node is separate from the join operation results node.

The operations can include wherein the operations of the remote query processor further include returning join operation results with strict ordering to guarantee ordering.

The operations can include wherein the operations of the remote query processor further include returning the join operation results that can contain arrays mapped to data.

The operations can include wherein the strict ordering is according to time.

The operations can include wherein the strict ordering is dictated by an order of data in the two or more input tables.

The operations can include wherein the changes include one or more of an add, modify, delete, or re-index.

The operations can include wherein the operations of the remote query processor further comprise automatically re-applying the join operation when the real-time merged notification listener detects any one of an add, modify, delete, or re-index message.

The operations can include further comprising when the two or more input tables are derived from a same ancestor table, changes in the same ancestor table cause a cascade of change notifications through the update propagation graph causing the remote query processor to combine the change notifications for efficiency and consistency.

The operations can include wherein the automatically re-applying is only applied to changed portions of the two or more input tables and not to unchanged portions.

The operations can include wherein the join criteria includes a formula.

Some implementations can include a method for dynamic updating of join operations, the method comprising sending a digital request for a remote query processor from a client computer to a remote query processor on a query server computer. The method can also include automatically connecting the client computer to the remote query processor via the digital communications network. The method can further include receiving a join-based query digitally from the client computer to the remote query processor that contains two or more input tables to be joined. The method can also include adding a node for each table providing input to the join operation to the update propagation graph. The method can include adding a join operation results node to the update propagation graph for holding results of executing the join-based query. The method can also include adding a real-time merged notification listener for the join operation node in the update propagation graph. The method can include applying the join operation to the two or more input tables using indexes from the two or more input tables to identify and retrieve data needed for the join operation in order to minimize local memory and processor usage. The method can also include using the real-time merged notification listener for the join operation node to listen for any changes to the joined two or more input tables in order to minimize local memory and processor usage by only conducting a join operation when a change has been detected. The method can further include when the real-time merged notification listener receives notification of changes to any of the joined two or more input tables, using indexes from the two or more input tables to apply the join operation only to the changes to update the join operation results node only for changed index ranges in order to minimize local memory and processor usage.

Some implementations can include a nontransitory computer readable medium having stored thereon software instructions that, when executed by one or more processors, cause the one or more processors to perform operations. The operations can include sending a digital request for a remote query processor from a client computer to a remote query processor on a query server computer. The operations can also include at the remote query processor, performing operations. The operations can include automatically connecting the client computer to the remote query processor via the digital communications network. The operations can also include receiving a join-based query digitally from the client computer to the remote query processor that contains two or more input tables to be joined. The operations can further include adding a node for each table providing input to the join operation to the update propagation graph. The operations can also include adding a join operation results node to the update propagation graph for holding results of executing the join-based query. The operations can include adding a real-time merged notification listener for the join operation node in the update propagation graph. The operations can also include applying the join operation to the two or more input tables using indexes from the two or more input tables to identify and retrieve data needed for the join operation in order to minimize local memory and processor usage. The operations can further include using the real-time merged notification listener for the join operation node to listen for any changes to the joined two or more input tables in order to minimize local memory and processor usage by only conducting a join operation when a change has been detected. The operations can also include when the real-time merged notification listener receives notification of changes to any of the joined two or more input tables, using indexes from the two or more input tables to apply the join operation only to the changes to update the join operation results node only for changed index ranges in order to minimize local memory and processor usage.

DETAILED DESCRIPTION

Reference is made herein to the Java programming language, Java classes, Java bytecode and the Java Virtual Machine (JVM) for purposes of illustrating example implementations. It will he appreciated that implementations can include other programming languages (e.g., groovy, Scala, R. Go, etc.), other programming language structures as an alternative to or in addition to Java classes (e.g., other language classes, objects, data structures, program units, code portions, script portions, etc), other types of bytecode, object code and/or executable code, and/or other virtual machines or hardware implemented machines configured to execute a data system query.

Figure 1:
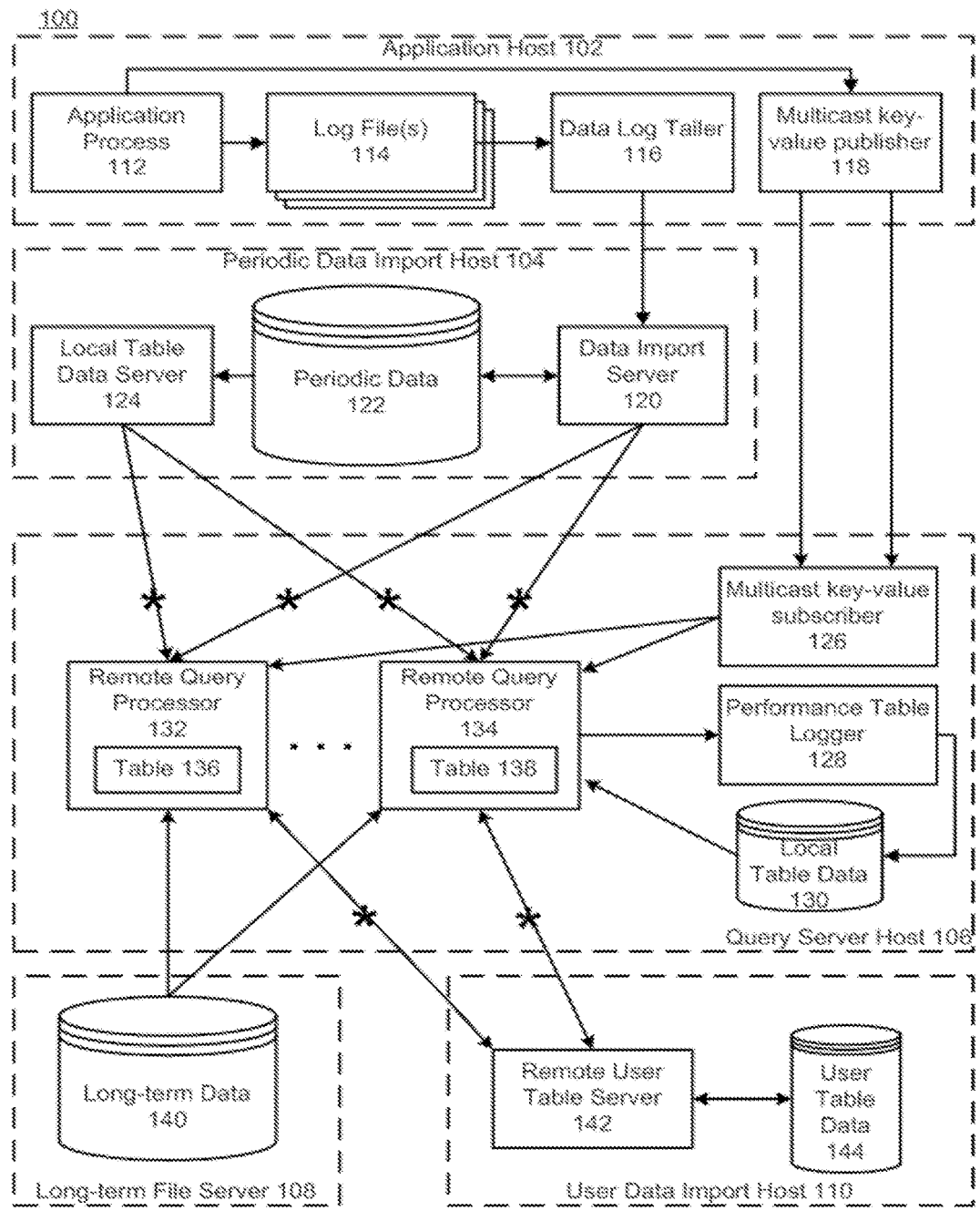
FIG. 1 is a diagram of an example computer data system showing an example data distribution configuration in accordance with some implementations.
Figure 2:
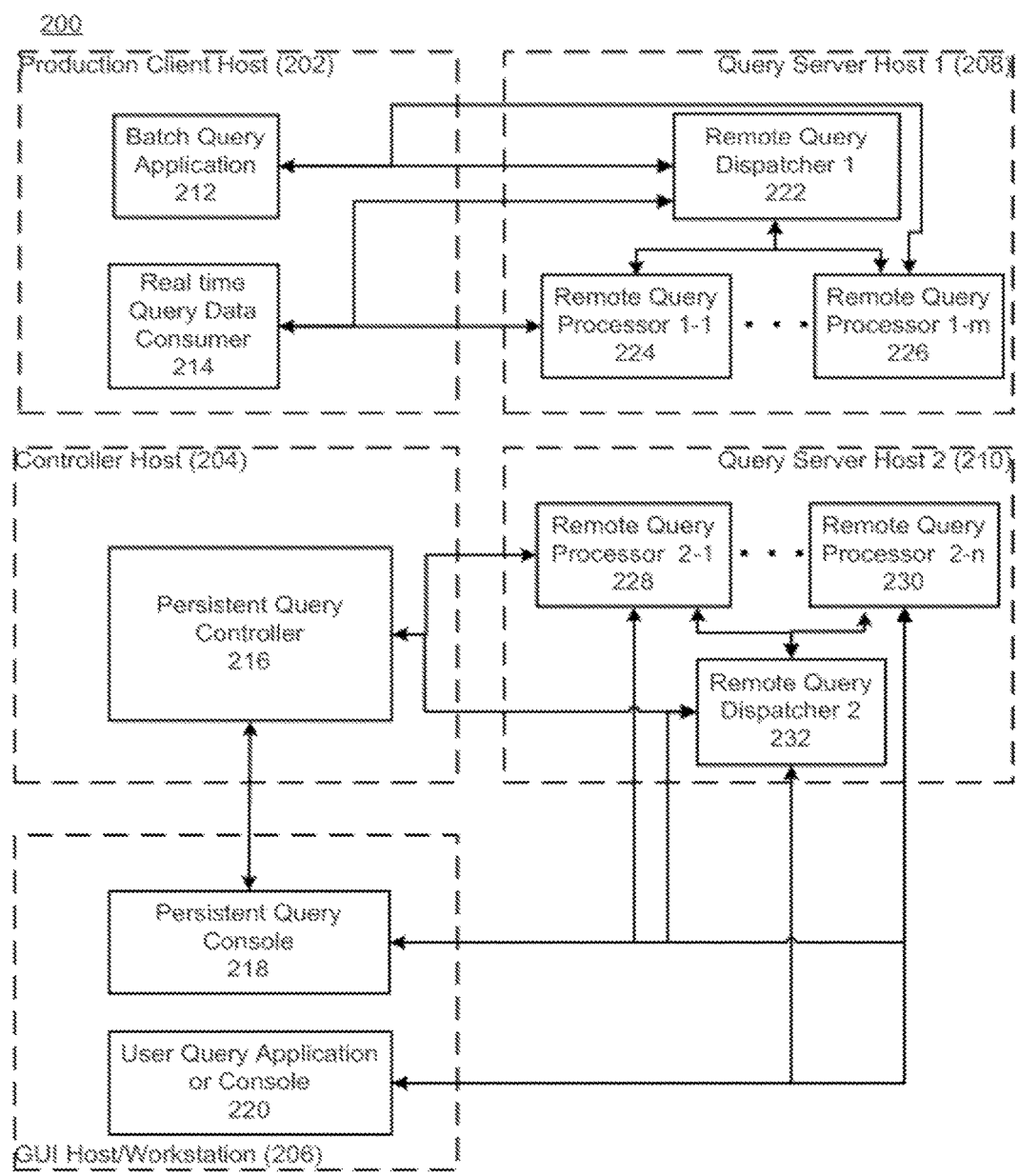
FIG. 2 is a diagram of an example computer data system showing an example administration/process control arrangement in accordance with some implementations.

FIG. 1 is a diagram of an example computer data system and network 100 showing an example data distribution configuration in accordance with sonic implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( )statement execution, for example. A TableMap object is can be the result of a byExternal( )statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log milers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to he limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118), Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
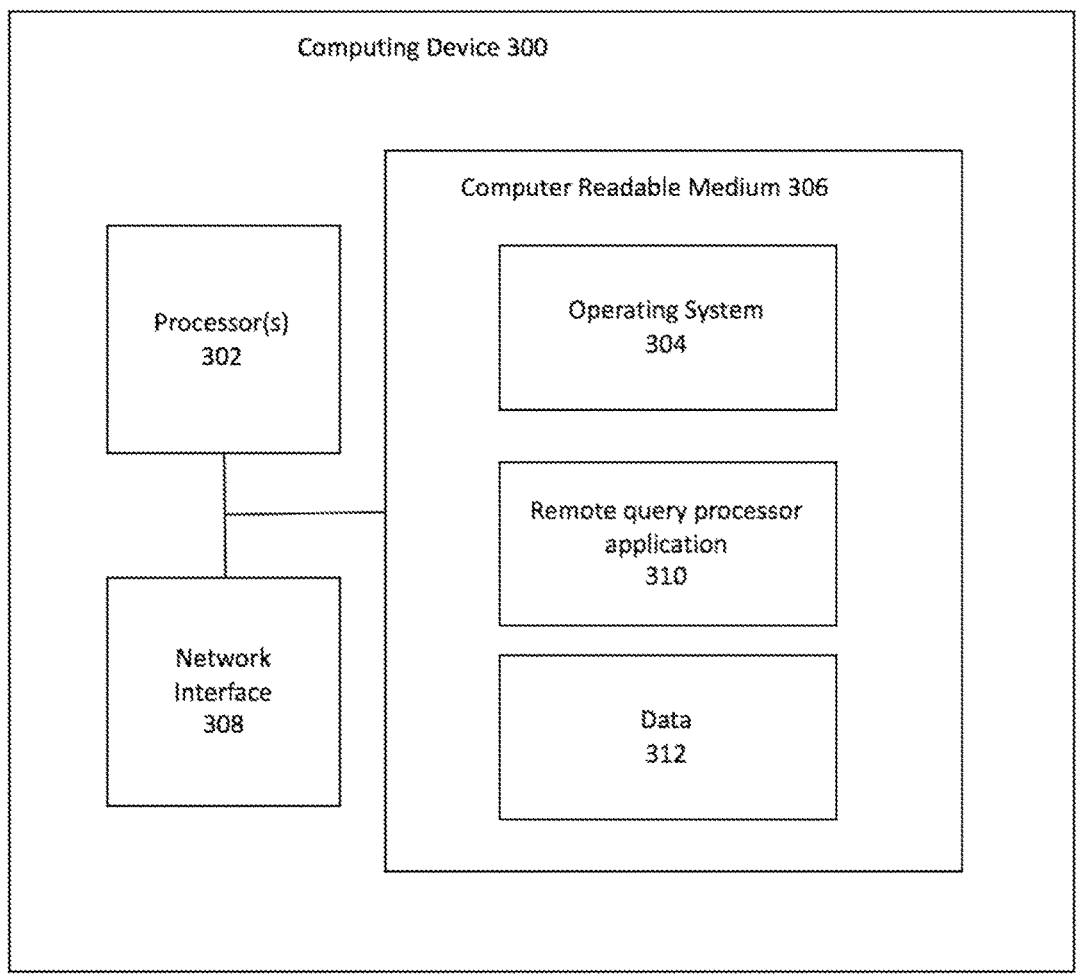
FIG. 3 is a diagram of an example computing device configured for remote query processor processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include a remote query processor application 310 and a data section 312 (e.g., for storing ASTs, precompiled code, etc.).

In operation, the processor 302 may execute the remote query processor application 310 stored in the memory 306. The remote query processor application 310 can include software instructions that, when executed by the processor, cause the processor to perform operations for executing and updating queries in accordance with the present disclosure (e.g., performing one or more of 502-526, 550-572, 602-612 described below).

The remote query processor application program 310 can operate in conjunction with the data section 312 and the operating system 304.

A varied set of join operations can provide a powerful tool set to users for manipulating data with one join command versus the use of several joins or looping code. Each join in a set of joins can be built for particular types of input tables to provide a desired type of result.

Figure 3A:
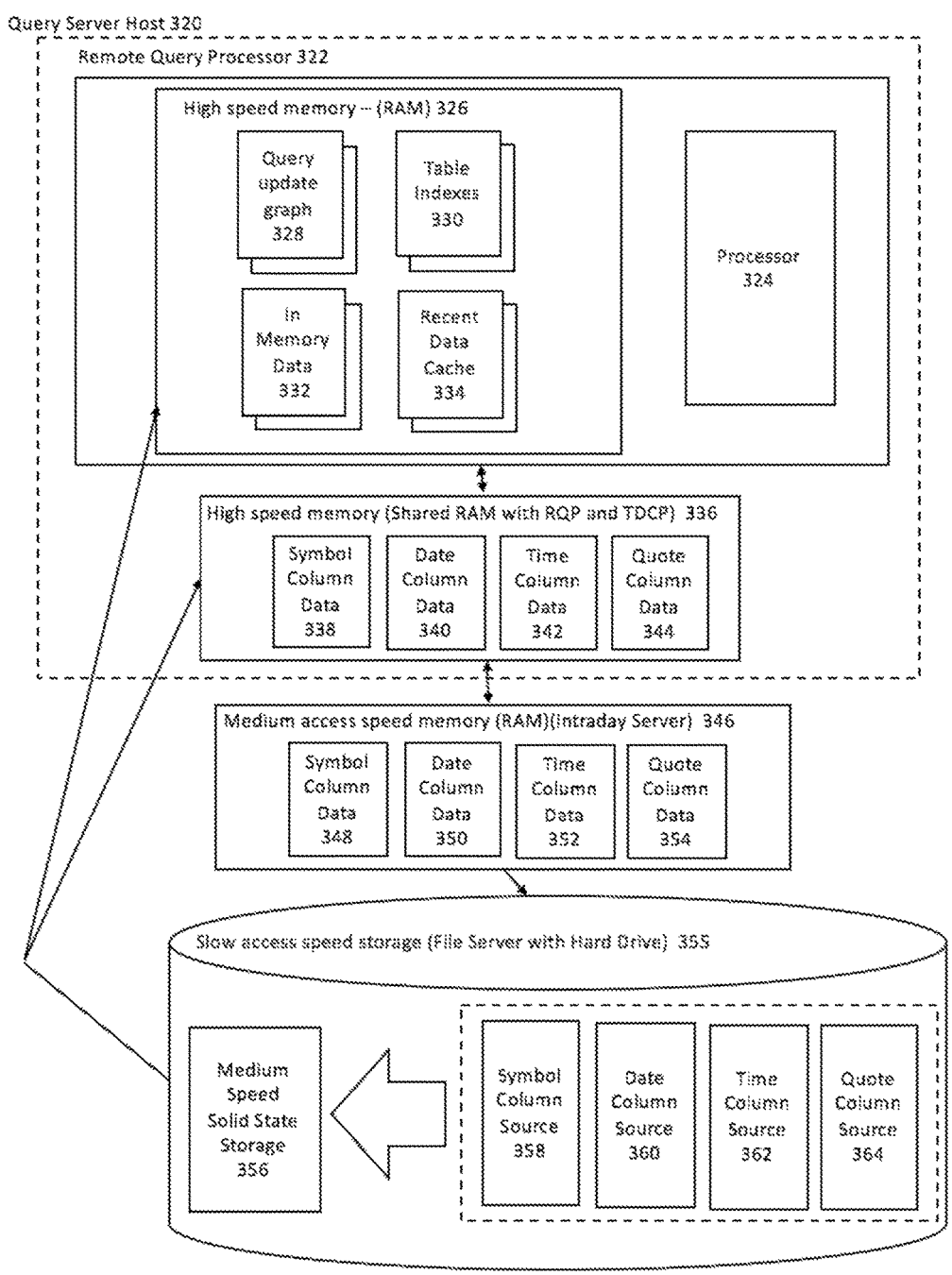
FIG. 3A is a diagram of an example query server host data sources in accordance with some implementations.

FIG. 3A is a diagram of an example query server host 320 with associated data stores in accordance with at least one embodiment. A query server host 320 can contain one or more remote query processors 322 (as described at 310) and high speed memory, for example shared RAM 336 plus access to medium access speed memory 346 and slow access speed storage 354.

The remote query processor 322 can contain one or more processors 324 and high speed memory 326 such as RAM. The high speed memory 326 can contain one or more update propagation graphs 328, one or more table indexes 330, in memory data 332, and recent data cache 334. The high speed memory 326 can request and retrieve data from one or more slow access speed storages 355 and/or from high speed memory 336.

The high speed memory 336 can be memory that is shared with one or more remote query processors 322 and one or more table data cache proxies (not shown). The high speed memory 336 can contain one or more data columns, for example, a symbol column data 338, a date column data 340, a time column data 342, and a quote column data 344. The high speed memory 336 can exchange data with remote query processor 322 high speed memory 326 and/or medium access speed memory 346, and can request and receive data from slow access speed storage 355.

The medium access speed memory 346 can contain one or more data columns, for example, symbol column data 348, a date column data 350, a time column data 352, and a quote column data 354. Medium access speed memory 346 can exchange data with high speed memory 336 and transmit data to a slow access speed storage 355.

The slow access speed storage 355, for example, a file server with one or more hard drives, can contain one or more source columns, for example, a symbol column source 358, a date column source 360, a time column source 362, and a quote column source 364. The one or more column source can be copied into medium speed solid state storage 356, for example, flash, to provide faster access for more frequently accessed data.

Figure 3B:
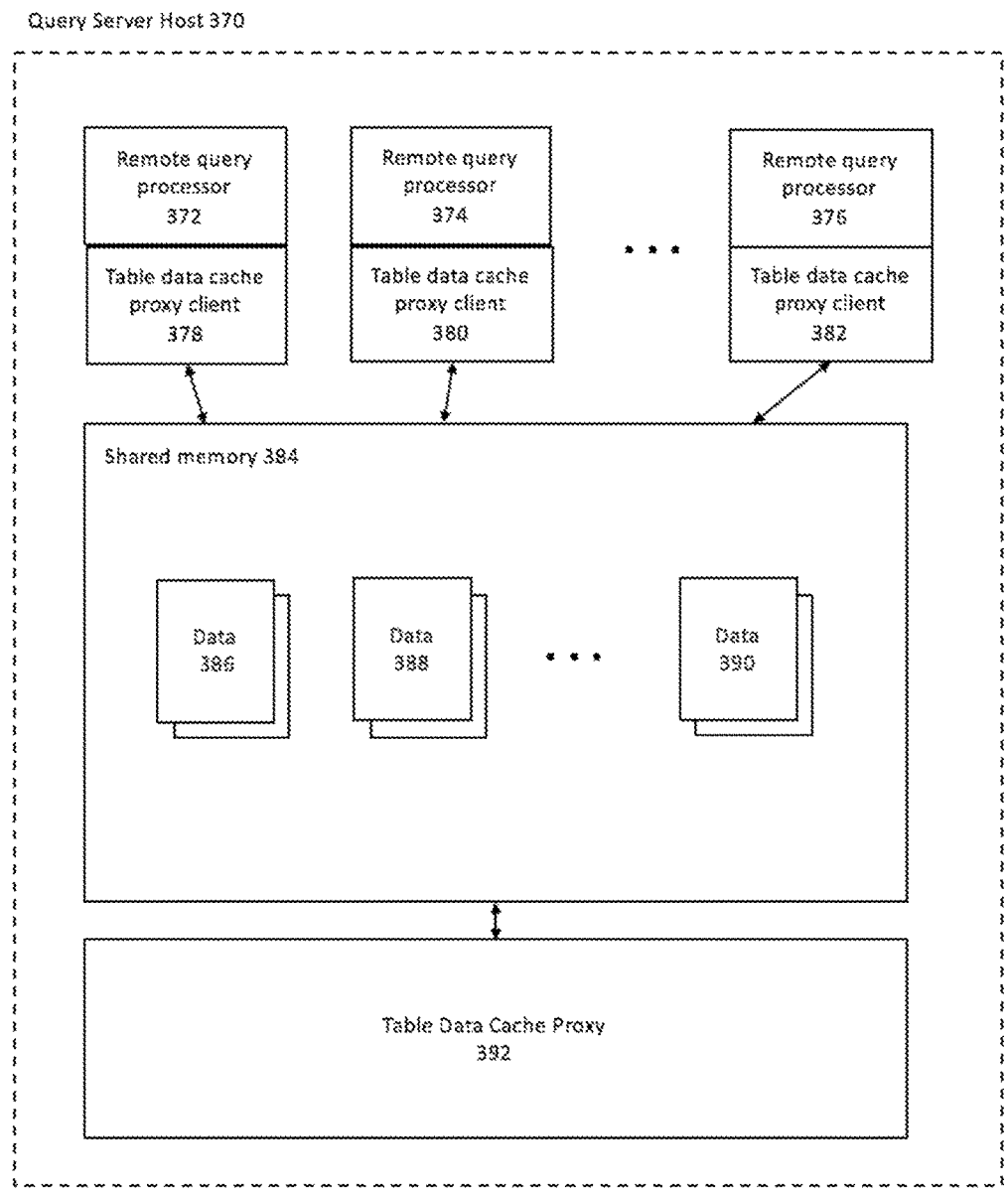
FIG. 3B is a diagram of an example query server host in accordance with some implementations.

FIG. 3B is a diagram of an example query server host 370 as described at 320 in accordance with at least one embodiment. A query server host can contain one or more remote query processors (372, 374, 376) associated with one or more table data cache proxy clients (378, 380, 382), a shared memory 384 as described at 336 that can exchange data (386, 388, 390) with the table data cache proxy clients (378, 380, 382), and one or more table data cache proxies 392 that can exchange data with the shared memory 384.

In general, some implementations can include a computer data system that stores and retrieves data (e.g., time series data) according to strict ordering rules. These rules ensure that data is stored in a strict order and that results of a query are evaluated and returned in the same order each time the query is executed. This can provide an advantage of optimizing the query code for query execution speed by permitting a user and query process (e.g., a remote query processor) to rely on an expected ordering and eliminate a need for performing an additional sorting operation on query results to achieve an expected or needed ordering for downstream operations. also allows data to be ordered according to the source's data publication order without necessarily including data elements to refer to for query evaluation or result ordering purposes. It should be noted that updates from real-time or changing data, however, may not always be seen in the same order, since data is processed after asynchronous notifications and according to refresh cycles that progress at different speed and frequency in distinct remote query processors or client processes. Updates are not necessarily the results of a query, though. For some implementations order within a partition is always maintained.

For example, in the real-time (or periodic) case, a data system may store data in arrival order (which is typically time-series order) within the partition of the table that corresponds to a given data source. In the permanent-store case (or long term storage case), the computer data system starts with the real-time order and then re-partitions, optionally groups, and optionally sorts the real-time (or periodic) data according to one or more columns or formulas, otherwise respecting the retrieval order for the real-time data when producing the new stored data and its ordering.

Some implementations can include a partitioned data store that has partitions based, at least in part, on a file system and can include physical machine partitions, virtual machine partitions and/or file system directory structure partitions. For example, partitions A, B and C of a data store (e.g., a column data source) may reside in different directories of a file system. In addition to different directories, the data store may be distributed across a plurality of data servers (physical or virtual) such that the data is partitioned to a given server and within that server, the data may be sub-partitioned to one or more directories, and within each directory, the data may be further partitioned into one or more sub-directories and/or one or more files.

Partitioning the data using a file system provides an advantage in that the location keys and retrieval instructions for storage locations of interest for potential query result data can be discovered by means of traversing a directory structure, rather than a separately-maintained location key and location retrieval information discovery service. Once discovered, locations can be narrowed from the full set of locations to a sub-set according to query instructions, which can help speed up query operations by permitting the data system to defer accessing actual data ("lazy loading") and begin to narrow down the set of rows to evaluate without handling data (e.g., in memory and/or transmitting via a communication network) This is further enhanced by support in the data system's query engine for partitioning columns—columns of the data that are a property of all rows in any location retrieved from a given partition of the location key space, typically embodied in the name of a sub-directory when a file system is used in this way, Certain query operations can thus be executed in whole or in part against location key fields on a per-partition basis rather than against column data on a per-row basis. This may greatly improve execution performance by decreasing the input size of the calculations by several orders of magnitude.

Within a partition, data may be grouped according to a column value. The grouping may have one or more levels, with a multi-level grouping having a logical hierarchy based on the values of two or more columns, such that groups in "higher-level" columns fully-enclose groups in "lower-level" columns. Further, within a partition or group, the data can be ordered according to a given ordering scheme, e.g. strictly by the real-time recording order, or according to some sorting criteria. Grouping in this way can enhance query performance by allowing for very simple, high performance data indexing, and by increasing the physical locality of related data, which in turn can reduce the number of rows or blocks that must be evaluated, and/or allow for extremely performant data caching and pre-fetching, with high cache hit ratios achieved with smaller cache sizes than some other data systems.

For example, securities trading data may be partitioned across servers by a formula that takes ticker symbol as input. Within each server, the data may be partitioned by a directory corresponding to trade data date, Within each date partition directory, data may be in a file grouped by one or more ticker symbol values. Within each ticker symbol group, the data may be ordered by time.

In another example, when generating a query result table, the data system can first focus on a server (or servers) for the symbol (or symbols) being accessed, then one or more partitions for the date(s) of interest, then one or more files and group(s) within the file(s) before any data is actually accessed or moved. Once the data system resolves the actual data responsive to the query, the data (or references to the data in one or more data sources) can be retrieved and stored into a query result table according to a strict ordering and will be evaluated and returned in that same order each time the query is executed.

It will be appreciated that some data stores or tables can include data that may be partitioned, grouped, and/or ordered. For example, some data may be partitioned and ordered, but not grouped (e.g., periodic data such as intraday trading data). Other data may be partitioned, grouped and ordered (e.g., long-term storage data such as historical trading data). Also it will be appreciated that any individual table, partition or group can be ordered. Partitions can be grouped according to a grouping and/or ordering specific to each partition.

Figure 4:
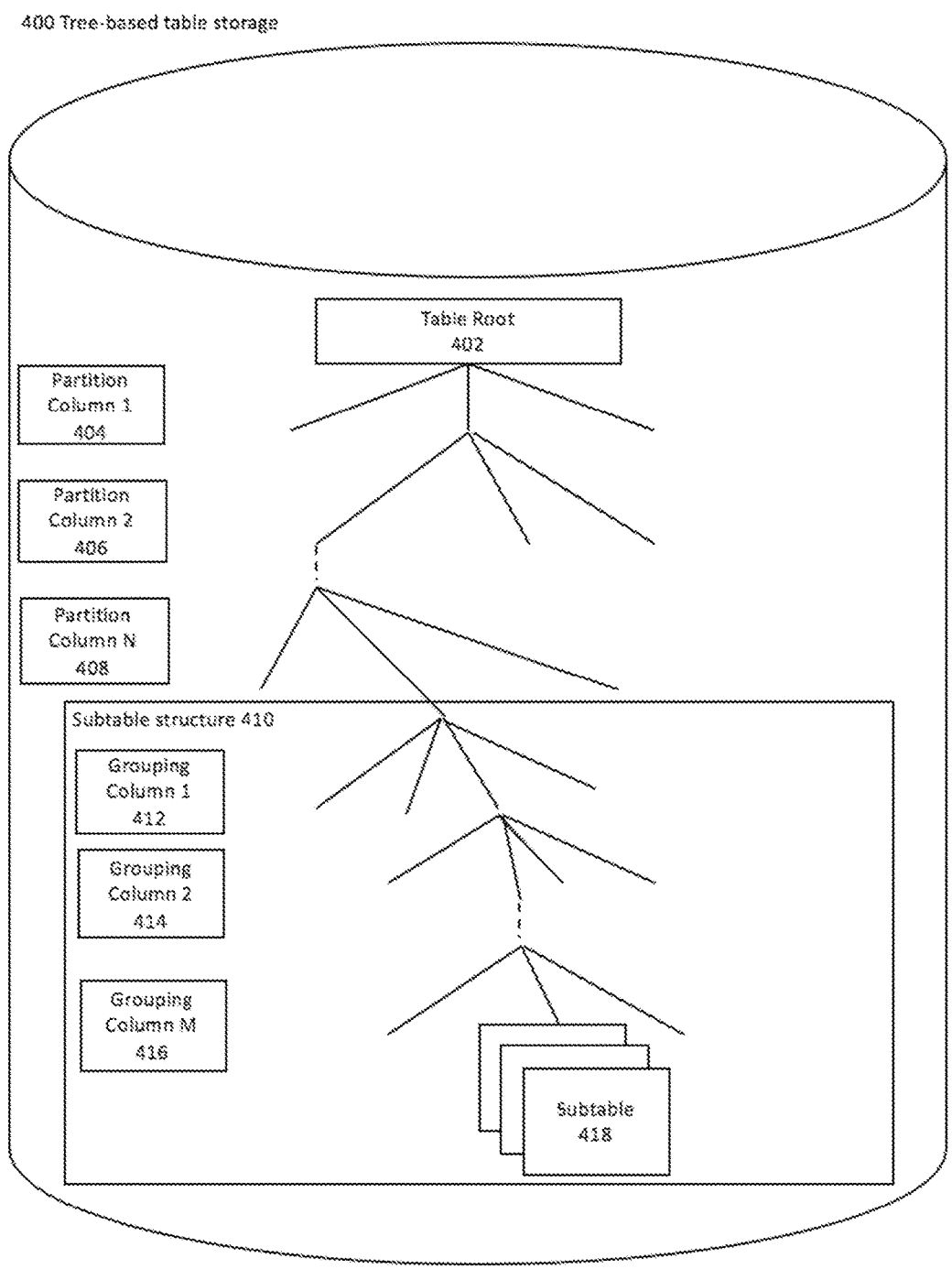
FIG. 4 is a diagram of an example tree-based table storage in accordance with some implementations.

FIG. 4 is a diagram of an example tree-based table storage 400 in accordance with at least one embodiment. Tables, especially large tables, can benefit from a hierarchical tree-based structure as shown in 400. The tree root 402. can be a table handle. Underneath the table root 402 can be a series of partition columns (404, 406, 408). The partitioning can be implemented in a filesystem, object store or the like. The partition columns (404, 406, 408) can be visible to a user or hidden from a user. For example, a column could be partitioned by date and each partition could contain data for a single date, such as Mar. 18, 2016. In this example, the date can be a table column visible to a user. The partition columns can also be used to divide the workload for maintaining a column over more than one fileserver.

The leaf nodes of a partition column can be subtables. An example subtable structure is shown at 410, In a subtable structure 410, data in the form of a subtable 418 can he stored for all rows and columns of a table.

For example, a table can have a logical table schema of columns for Date, Ticker Symbol, Timestamp, Bid Price and Ask Price. In this example, two partition columns can be created under the table root, one partition for Date and one partition for FileServer. The Date partition column (for example, 404) can contain directory paths to data for a single date, such as Mar. 18, 2016. Because the data is all of the same date, Mar. 18, 2016, the subtable 418 does not need to contain a Date value. In this example, the data 418 for the same date, Mar. 18, 2016, can be spread across multiple file servers. A second partition column (for example, 406) is set under the Date partition column in the tree to provide a path, such as <table>/<date>/<fileserver>, to locate all the Date data for Mar. 18, 2016. As noted earlier in this example, the Date partition column can be visible to a user, but a fileserver partition column may not be visible.

The data partition column is visible to the user to help the user formulate queries that can take advantage of the tree structure. For example, query performance can be enhanced by applying filters, such as where clauses, in an order based on the location of the data in a tree, Generally, applying the filter to a partition column closer to the table root 402 can minimize the amount of data processed to arrive at a final result. For example, in the Date, Ticker Symbol, Timestamp, Bid Price, Ask Price example, the most efficient filtering order is Date followed by Ticker Symbol. In this example, table.where ("Date=d", "Sym='AAPL'", "Bid>1000") can be much faster than table.where ("BID>1000", "Sym='AAPL'", "Date=d"). In table where ("Date=d", "Sym='AAPL'", "Bid>1000"), only the subtables 418 under the date "d" partition column needs to be retrieved for processing because the subtables 418 in this example are already partitioned by date, the system does not need to provide any additional filtering work for date. In contrast table.where ("BID>1000", "Sym='AAPL'", "Date=d") can require every bid for every stock ticker for every date to be retrieved and processed because the "BID>1000" is processed first, and a partition column for "BID>1000" may not exist. As shown by this example, partition columns can be used to provide a built-in filter option that does not require the system to re-filter per each query the filters on the contents of the partition columns.

It will be appreciated that if the user had placed "Sym='AAPL'" before "BID>1000" in the where statement, the system could have filtered on a grouping by ticker symbols to more efficiently locate AAPL before then finding bids greater than 1000. Without using the group by ticker symbols first, all bids greater than 1000 would be retrieved.

It will also be appreciated that partition columns are not limited to Date or Fileserver. Any common attribute that would provide performance gains if pre-filtered can be a good candidate for partition columns.

It will also be appreciated that query performance gains can be achieved by creating grouping columns (412, 414, 416) underneath the Date partition columns, For example, a grouping column could be created for each distinct ticker symbol.

It will be further appreciated that the system can process each filter and determine which column each filter depends on. Then, based upon where the columns are located in the tree structure, the system can rank the filters based upon how much of the tree the system removes for future filters. For example, when processing date, symbol, and bid columns, date can be the highest in the tree (partition column) followed by Symbol (grouping column) followed by Bid (normal column). If 3 filters are submitted by a user that has dependencies on the date, symbol, and bid columns, the system can make an educated guess at the order the clauses can best be executed for maximum efficiency. For example, given t1.where("Bid>10","Symbol='AAPL'","Date= today( )"), the system can reorder to t1.where("Date= today( )","Symbol='AAPL'","Bid>10") to maximize efficiency.

Figure 4A:
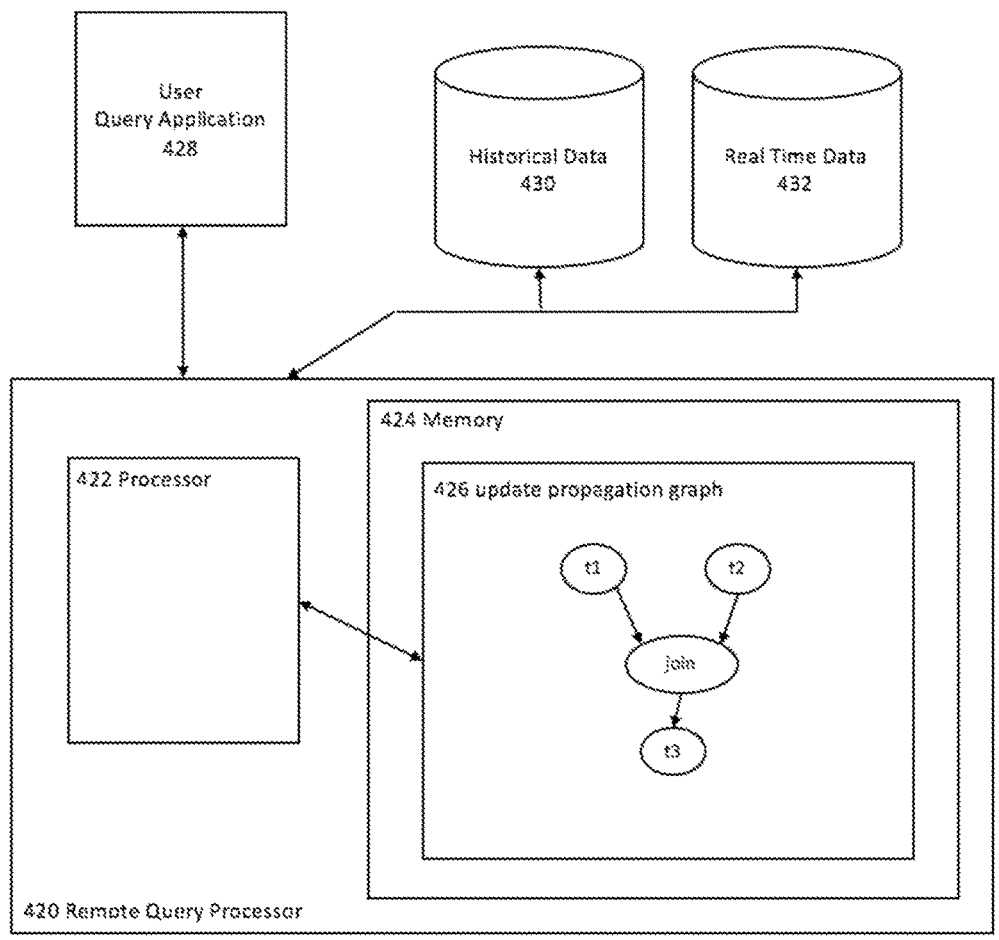
FIG. 4A is a diagram of example basic query components in accordance with some implementations.

FIG. 4A is a diagram an example of basic query components in accordance with at least one embodiment. A remote query processor 420 can contain a one or more processors 422. and memory 424. A remote query processor 420 memory 424 can contain one or more update propagation graphs 426, An update propagation graph 426 can contain a graphical node representation of a query such as a join operation on two tables (t1 and t2) to create a third table (t3).

It will be appreciated that an update propagation graph can contain dynamic nodes that are table objects that can be updated frequently over time as well as static nodes that do not change over time.

A remote query processor 420 can exchange data with one or more historical data 430 sources and/or one or more real-time data 432 sources, A remote query processor 420 can also receive query tasks from one or more user query applications 428 and provide results back to one or more user query applications 428.

It will be appreciated that a remote query processor 420 can provide a client computer with an address assignment of the remote query processor, the address assignment identifying a specific port of the remote query processor 420 on a query server computer available to the client computer to connect over a digital communications network. The remote query processor 420 can automatically connect the client computer to the remote query processor via the digital communications network.

Figure 4B:
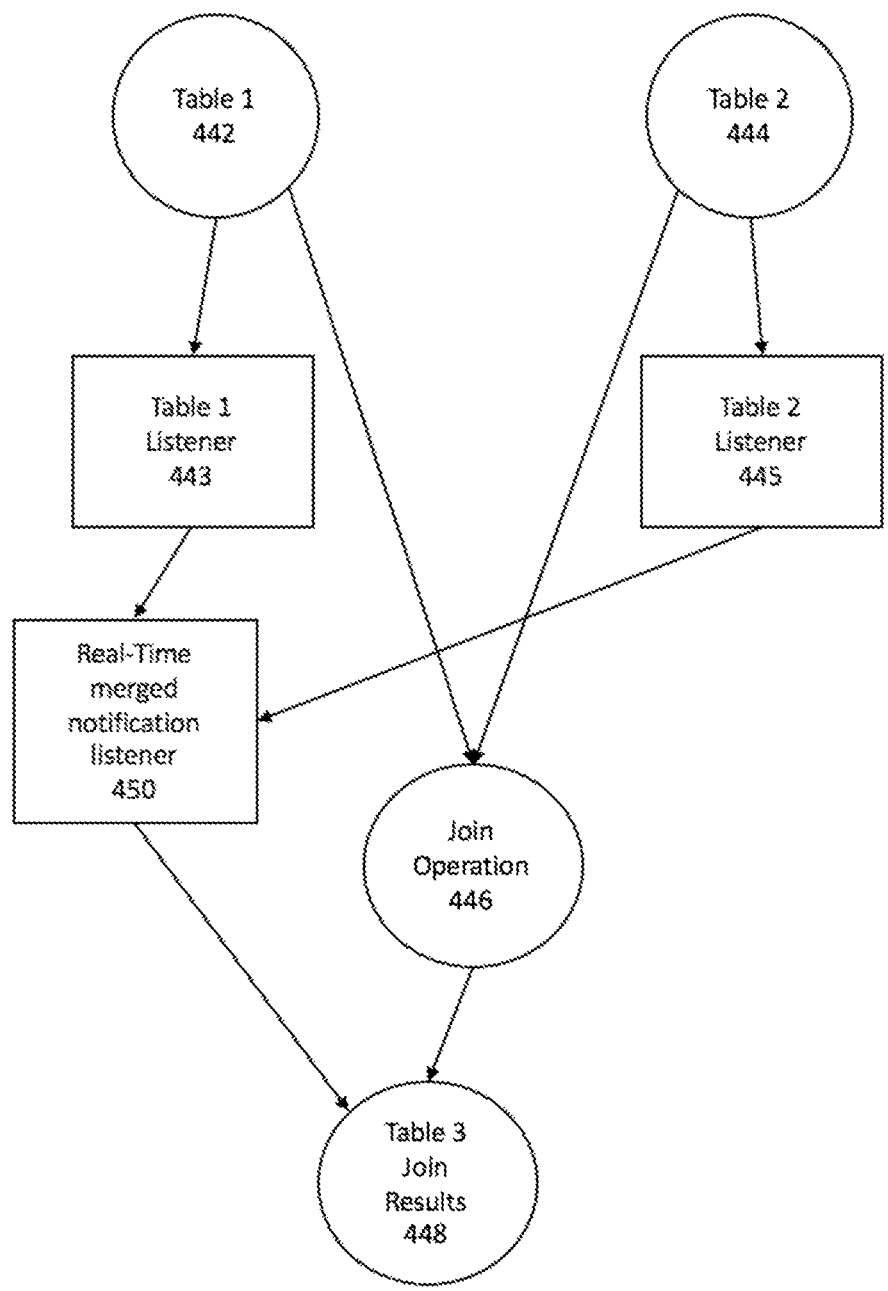
FIG. 4B is a diagram of an example update propagation graph for join operations in accordance with some implementations.

FIG. 4B is a diagram of an example update propagation graph for join operations 440 in accordance with some implementations. A node for table 1 442 and a node for table 2 444 can represent table objects that can be joined by a join operation 446 to create a table 3 containing the join results 448. An update propagation graph for join operations 440 can contain a table 1 listener 443, a table 2 listener 445, and real-time merged notification listener 450. A table 1 listener 443 can listen for changes to table 1 442 and a table 2 listener 445 can listen for changes to table 2 444. A real-time merged notification listener 450 can listen for one or more changes propagated from table 1 442 and table 2 444 that can then be joined by the join operation 446 through a table 1 listener 443 and a table 2 listener 445, respectively. When the real-time merged notification listener 450 is notified by, for example, an add, delete, modify, re-index, or other message, the table 3 join results 448 can be updated for those changes by executing the join operation 446 on the changes that occurred to table 1 442 and/or table 2 444.

It will be appreciated that a real-time merged listener can he a software construct that listens for change notifications, such as add, delete, modify, or re-index messages, or other message types propagated down the update propagation graph, In a real-time environment, changes can happen frequently, for example, every millisecond, second, minute, hour, etc.

It will be appreciated that table 1 442 and table 2 444 can be derived from a common ancestor table. For example, if 442 and 444 share a common ancestor, changes in the ancestor can trigger a cascade of add, modify, delete, or re-index (AMDR) messages through an update propagation graph, which can ultimately cause both 442 and 444 to create AMDR messages. The system can recognize that an ancestor caused both 442 and 444 to send AMDR messages to a join. Before creating its own AMDR message, the system join (various nodes and merge listener) can combine the AMDR messages for efficiency and consistency. The ultimate AMDR from the system join can then give a time-consistent view of processing all information simultaneously.

Figure 5:
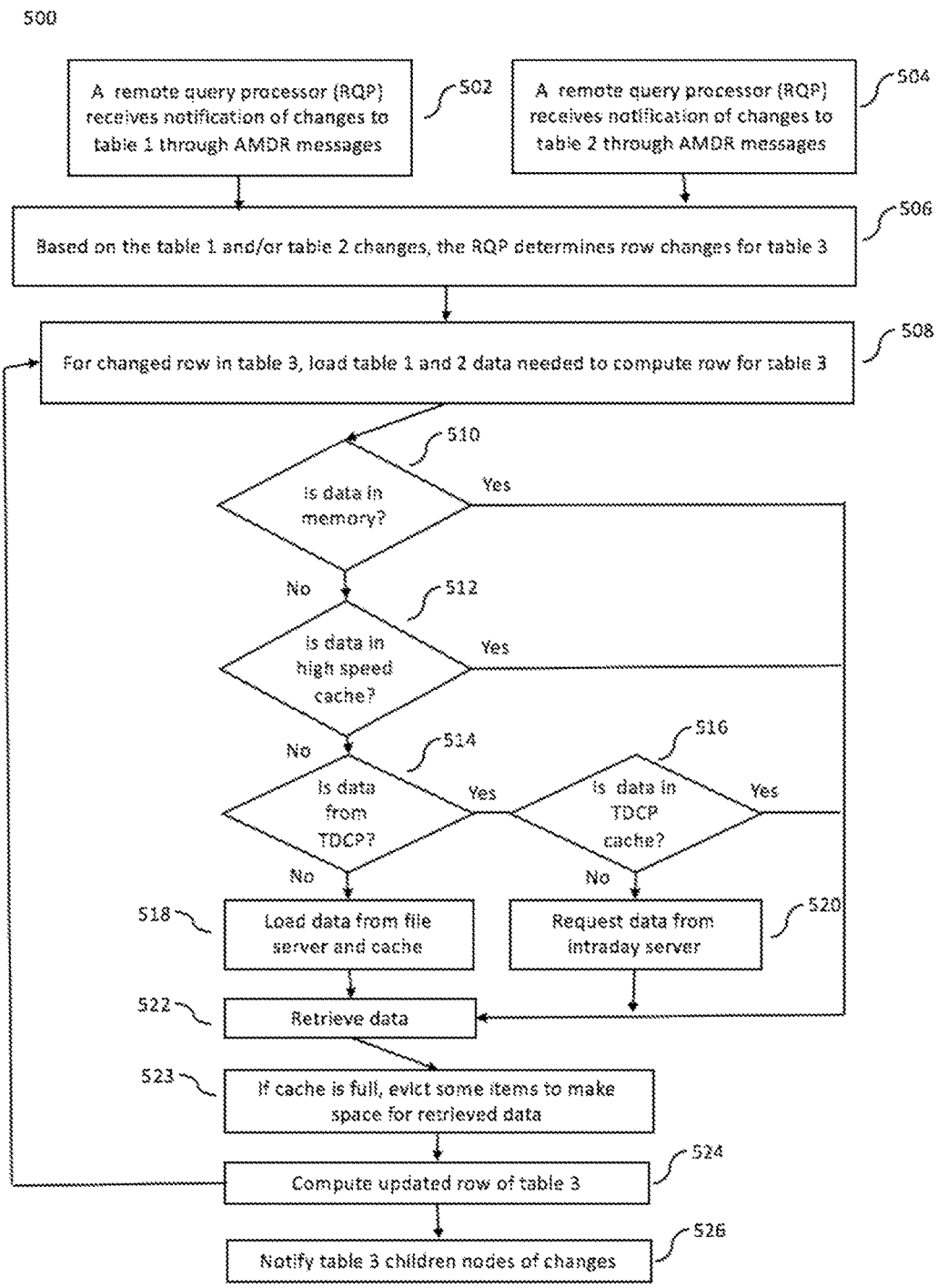
FIG. 5 is a flowchart of an example join operation update in accordance with some implementations.

FIG. 5 is a flowchart of an example join operation update in accordance with some implementations. Processing can begin at 502 and/or 504, when a remote query processor receives a notification of changes to table 1 through add, modify, delete, or re-index (AMDR) messages, or other message types, and/or a remote query processor receives a notification of changes to table 2 through AMDR messages, or other message types.

It will be appreciated that because table 3 has already been created by a join operation on tables 1 and 2 before 502 and 504 that any change to table 1 or table 2 will require an update to the join to update table 3. Processing continues to 506.

At 506, based on the changes to table 1 and/or table 2, the remote query processor determines row changes for table 3, Processing continues to 508.

At 508, for the row changes to be applied to table 3, table 1 and table 2 data that is needed to compute the row for table 3 is loaded. Processing continues to 510.

At 510, a determination is made by the remote query processor as to whether the needed data is in memory. If the data is in memory, processing continues to 510. If the data is not in memory processing continues to 512.

At 512, a determination is made by the remote query processor as to whether the needed data is in high speed cache. If the data is in high speed cache, processing continues to 522. If the data is not in high speed cache, processing continues to 514.

At 514, a determination is made by the remote query processor as to whether the needed data is available from a table data cache proxy (TDCP). If the data is available from a TDCP, processing continues to 516. the data is not available from a TDCP, processing continues to 518.

At 516, a determination is made by the remote query processor as to whether the needed data is in the TDCP cache. If the data is in the TDCP cache, processing continues to 522. If the data is not in the TDCP cache, processing continues to 520.

At 520, data is requested form an intraday server. Processing continues to 522.

At 518, data is loaded from a file server and/or file server cache. Processing continues to 522.

At 522, data is retrieved from the location where the data was found. Processing continues to 523.

At 523, if the cache is full, enough data is evicted from the cache to make space for the retrieved data. Processing continues to 524.

At 524, the updated row for table 3 is computed according to the join criteria. Processing returns back to 508 to continue the update cycle and continues to 526.

At 526, nodes below table 3 in the update propagation graph (child nodes of table 3) are notified of the changes to table 3.

Figure 5A:
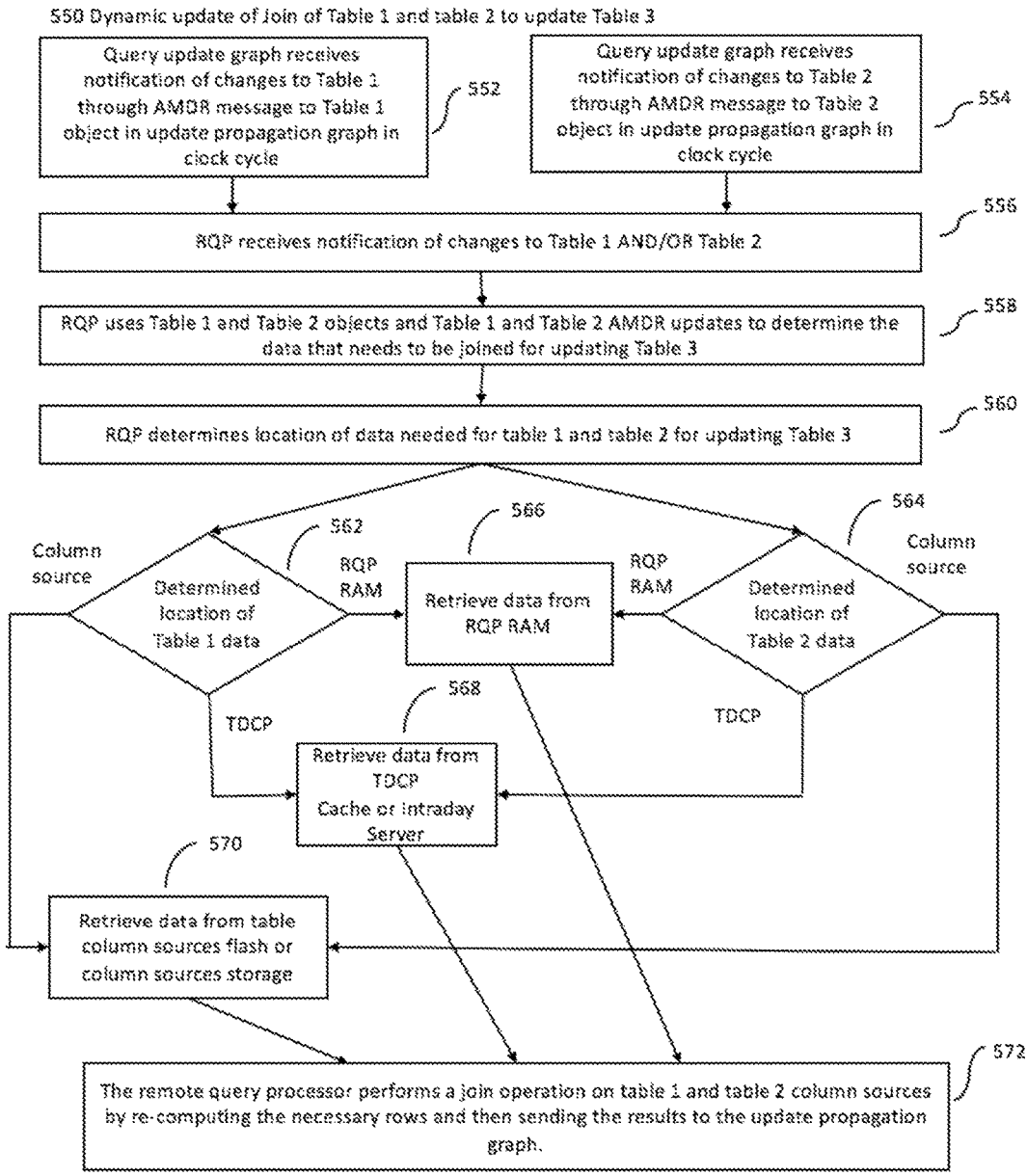
FIG. 5A is a diagram of an example dynamic update of a join in accordance with some implementations.

FIG. 5A is a flowchart of an example dynamic update of a join operation to table 1 and table 2 to update table 3 in accordance with some implementations. Processing can begin at 552 and/or 554, when an update propagation graph receives notification of changes to either table 1 and/or table 2 through AMDR messages to table 1 and/or table 2 objects in the update propagation graph within the update propagation graph clock cycle.

It will be appreciated that table 1 and table 2 can be derived for a common ancestor data store, such as a table as discussed in the FIG. 4B section above. Processing continues to 556.

At 556, the remote query processor receives notification of changes to table 1 and/or table 2. Processing continues to 558.

At 558, the remote query processor uses the table 1 and table 2 objects from the update propagation graph and the table 1 and table 2 AMDR update messages to determine the data that needs to be used in a join operation for updating table 3. Processing continues to 560.

At 560, the remote query operation determines the location of data needed for table 1 and table 2 for updating table 3, Processing continues to 562 and 564.

At 562, the location of table 1 data is determined to be located in either persistent (e.g. on-disk) column sources, remote query, processor memory, such as RAM, or a table data cache proxy (TDCP) Processing continues to 570 if the location is column sources, to 568 if the location is TDCP, or to 566 if the location is remote query, processor memory, such as RAM.

It will be appreciated that not all column sources or rows may be required to perform an update. The system defer loading of data until a particular section of data required to either perform the join operation or is requested by a downstream consumer of the table.

At 564, the location of table 2 data is determined to be located in either column sources, remote query processor memory, such as RAM, or a table data cache proxy (TDCP). Processing continues to 570 if the location is column sources, to 568 if the location is TDCP, or to 566 if the location is remote query processor memory, such as RAM.

At 566, data is retrieved from the remote query processor memory, such as RAM. Processing continues to 572.

At 568, data is retrieved from TDCP cache or intraday server. Processing continues to 572.

At 570, data is retrieved from table column sources flash or column sources storage.

It will be appreciated that any arbitrary storage hierarchy can be used. Processing continues to 572.

At 572, the remote query processor performs a join operation on table 1 and table 2 column sources by re-computing the necessary rows and then sending the results to the update propagation graph.

It will be appreciated the t3 can be added to the update query graph when the query is first executed, After the initial execution of the query, messages can be passed to a child after an update.

Figure 6:
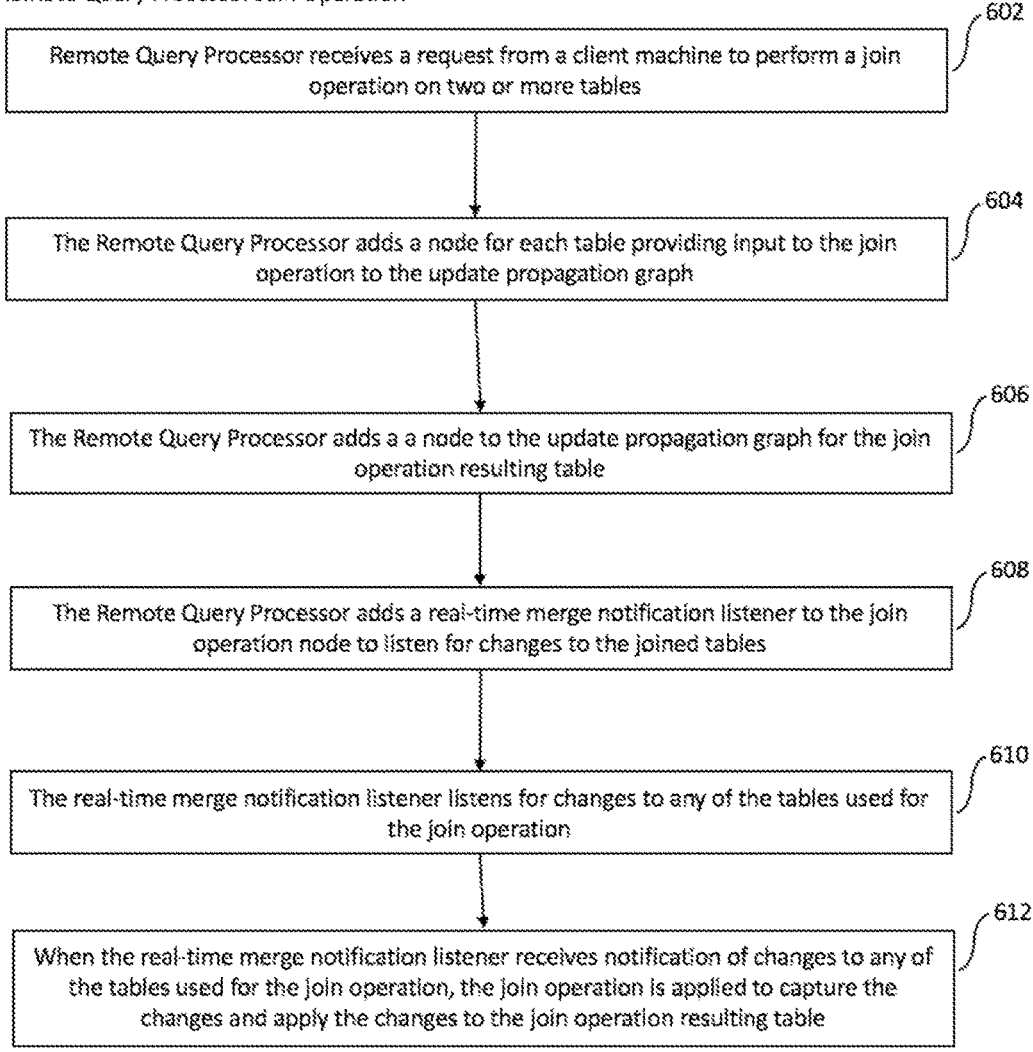
FIG. 6 is a flowchart of an example remote query processor join operation in accordance with some implementations.

FIG. 6 is a flowchart of an example remote query processor join action in accordance with some implementations. Processing begins at 602 when a remote query processor receives a request from a client machine to perform a join operation on two or more input tables.

It will be appreciated that a join operation can include without limitation, an as_of_join, left_join, a reverse_as_of_join, a range_as_of_join, a natural_join, an exact_join, or a join. Processing continues to 604.

At 604, the remote query processor adds a node for each table providing input to the join operation to the update propagation graph. Processing continues to 606.

At 606, the remote query processor adds a node to the update propagation graph for the join operation resulting table. Processing continues to 608.

At 608, the remote query processor adds a real-time merged notification listener to the join operation node to listen for changes to the joined tables. Processing continues to 610.

At 610, the real-time merged notification listener listens for changes to any of the tables used in the join operation. Processing continues to 612.

At 612, when the real-time merged notification listener receives notification of changes to any of the tables used in the join operation, the join operation is applied to capture the changes and apply the changes to the join operation resulting table.

Figure 7:
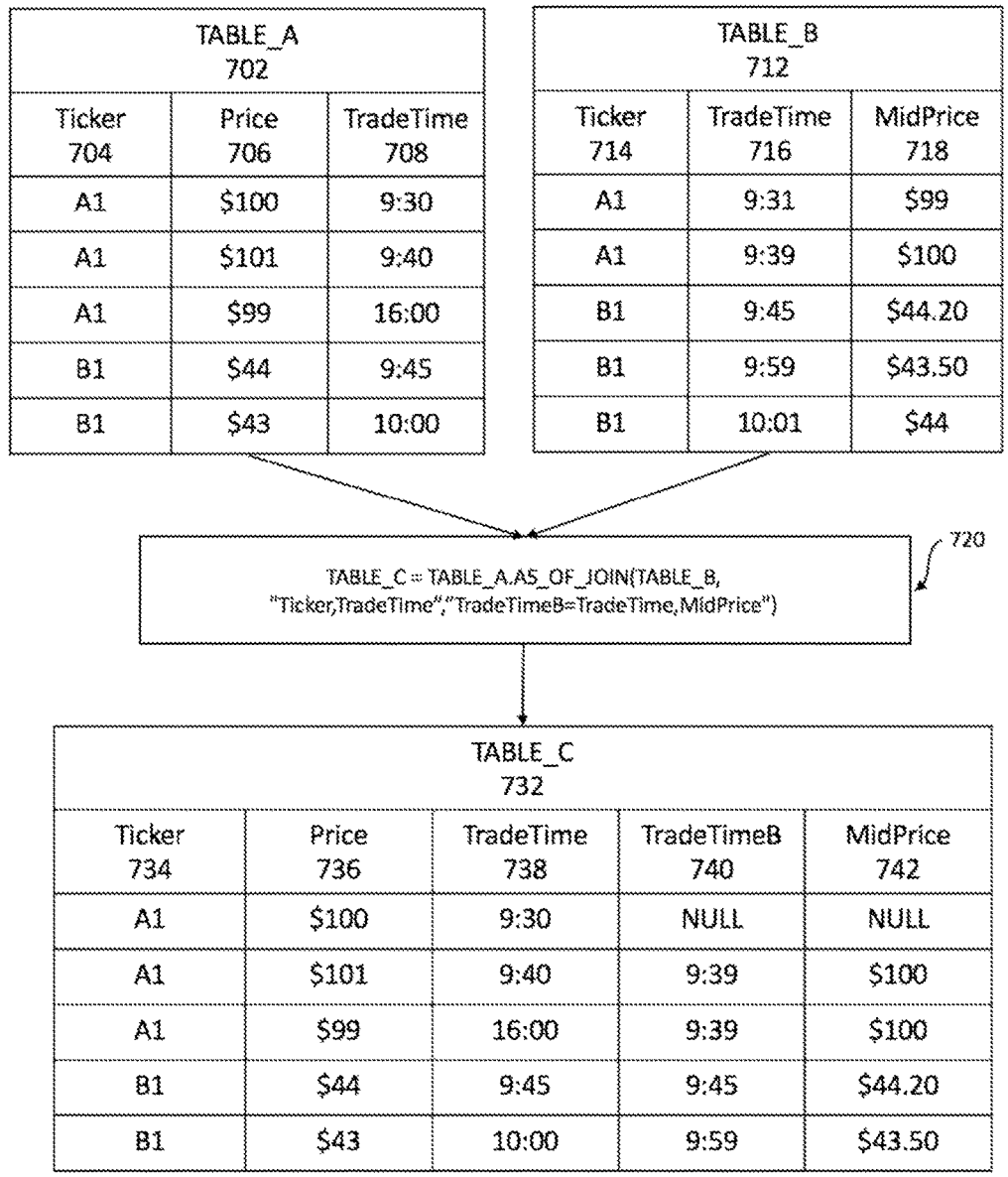
FIG. 7 is a diagram of an example as_of_join in accordance with sonic implementations.

It will be appreciated that a match for a join operation can be based on a formula FIG. 7 is a diagram of an example as_of_join in accordance with some implementations. In this example, a join operation can be used on Table_A (leftTable) and Table_B (rightTable) to create Table_C. The join operation in this example is an as_of_join 720. An exemplary command string for an as_of_join can be Table_C=leftTable aj(Table rightTable,String columnsToMatch,String columnsToAdd). The command can cause the system to look up columns in the rightTable that meet the match conditions in the columnsToMatch list. The columnsToMatch can be a comma separated list of match conditions such as "leftColumn=rightColumn" or "columnFoundInBoth", with the last match condition meaning really "leftColumn matches the highest value of rightColumn that is <=leftColumn" or "leftTable.columnFoundInBoth matches the highest value of rightTable.columnFoundInBoth that is <=leftTable.columnFoundInBoth". Matching is done exactly for the first n-1 columns and with less-than (e.g., via a binary search with a saved cursor. to improve adjacent lookups) for the last match pair. The columns of the leftTable can be returned intact, together with the columns from the rightTable defined in a comma separated list "columnsToAdd". The separated list "columnsToAdd" can be a comma separated list with columns form the rightTable that need to be added to the leftTable as a result of a match, expressed either as columnName or newColumnName=oldColumnName if renaming is desired or necessary. The keys of the last column to match should be monotonically increasing in the rightTable for any existing combination of the previous n-1 match columns. If more than one row matches, then any one of the matching rows may be selected. Which row is selected can be decided by the search algorithm.

In the as_of_join example shown in FIG. 7, leftTable table_A 702 is as_of joined with rightTable Table_B 712 with an as of join command 720 that creates the resultant table, Table_C 732. In this example, the values for ticker 704, price 706, and TradeTime 708 columns from Table_A remain the same in Table_C as ticker 734, price 736, TradeTime 738. The TradeTime 716 column from rightTable Table_B 712 is renamed in Table_C 732 as TradeTimeB 740. The MidPrice 718 column in Table_B 712 retains the same column name, MidPrice 742. In this example, the A1, $100, 9:30 first row in Table_A 702 does not have a match in Table_B 712 because every time value in TradeTime 716 for A1 is greater than 9:30. Accordingly, in Table_C 732, the TradeTimeB 740 and MidPrice 742 columns contain NULL values for the A1, $100, 9:30 row.

Figure 8:
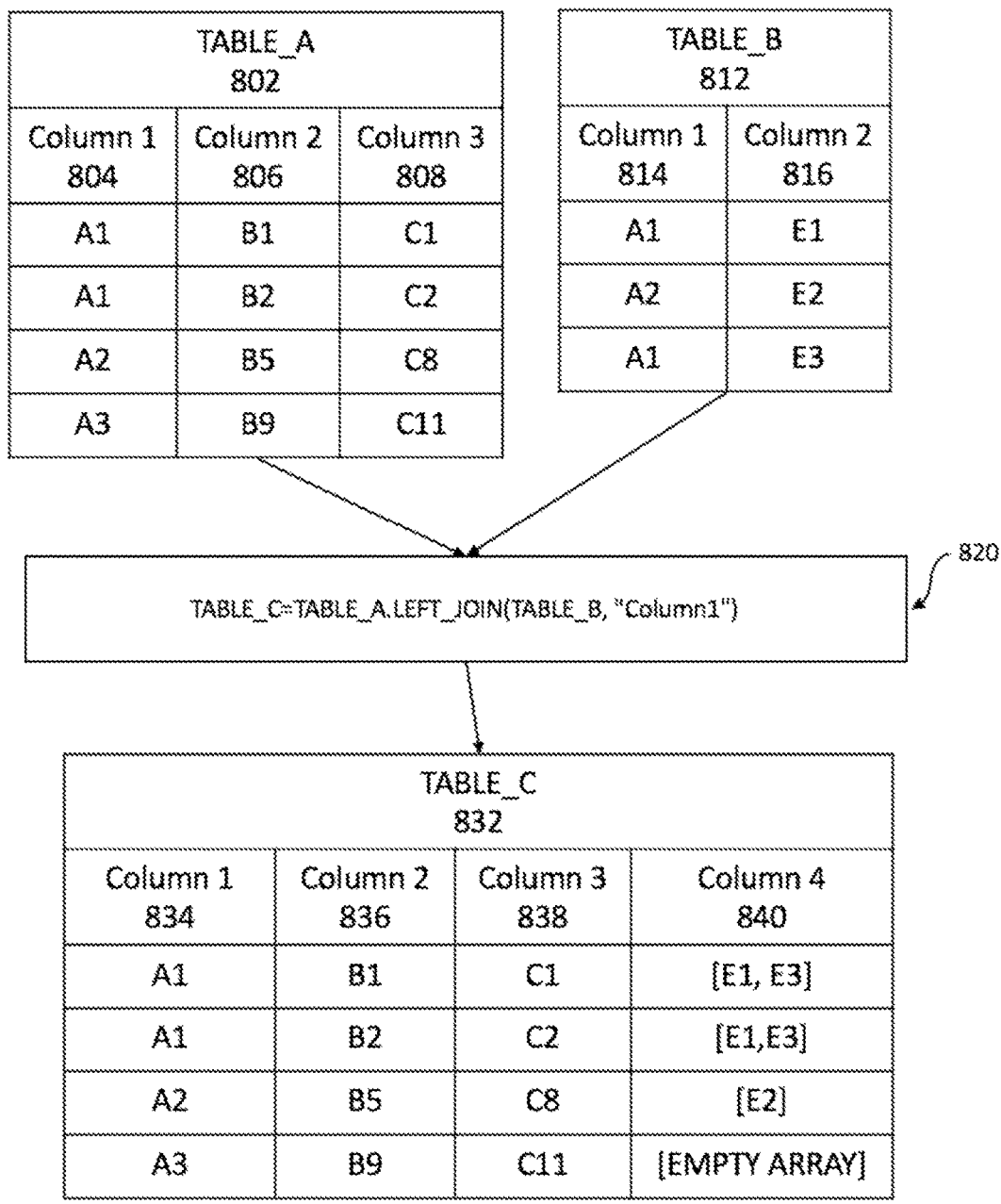
FIG. 8 is a diagram of an example left_join in accordance with some implementations.

FIG. 8 is a diagram of an example left_join in accordance with some implementations. In this example, a join operation can be used on Table_A and Table_B to create Table_C. The join operation in this example is a left_join. An exemplary command string for a left_join can be Table_C=leftTable leftJoin(Table rightTable,String columnsToMatch, String columnsToAdd).

The left_join operation can return a table that has one column for each of the leftTable's columns, and one column corresponding to each of the rightTable columns whose name does not overlap or are renamed in order to not overlap with the name of a column from the leftTable.

The new columns (those corresponding to the rightTable) can contain an aggregation of all values from the leftTable that match the join criteria. Consequently, the types of all rightTable columns not involved in a join criteria, is an array of the rightTable column type. If the two tables have columns with matching names, then the method can fail with an exception unless the columns with corresponding names are found in one of the matching criteria. A left_join operation does not necessarily involve an actual data copy, or an in-memory table creation.

It will be appreciated that the values for columns in a result table derived from a right table need not immediately be computed, but can be generated on demand when a user requests the values.

In the left_join example shown in FIG. 8, leftTable table_A 802 is left_joined with rightTable table_B 812 with a left_join command 820 that creates the resultant table, table_C 832. In this example, the values for column 1 804, column 2 806, and column 3 808 columns from table_A remain the same in table_C 832. The A1, B1, C1; A1, B2, C2; and A2, B5, C8 rows of table_A have matches in column 1 814 of table_B. The table_A row of A3, B9, C11 does not find an A3 match in table_B and the result is an empty array in column 4 840 of table_C 832. Alternative embodiments may instead use a sentinel result value instead of an empty array (e.g., NULL). Because two rows exist for A1 in table_B 812, a two value array of "E1" and "E3" is created in column 4 840 of table_C 832. A2 has one value in table_B 312 and thus has a single value array in column 4 840 of table_C.

Figure 9:
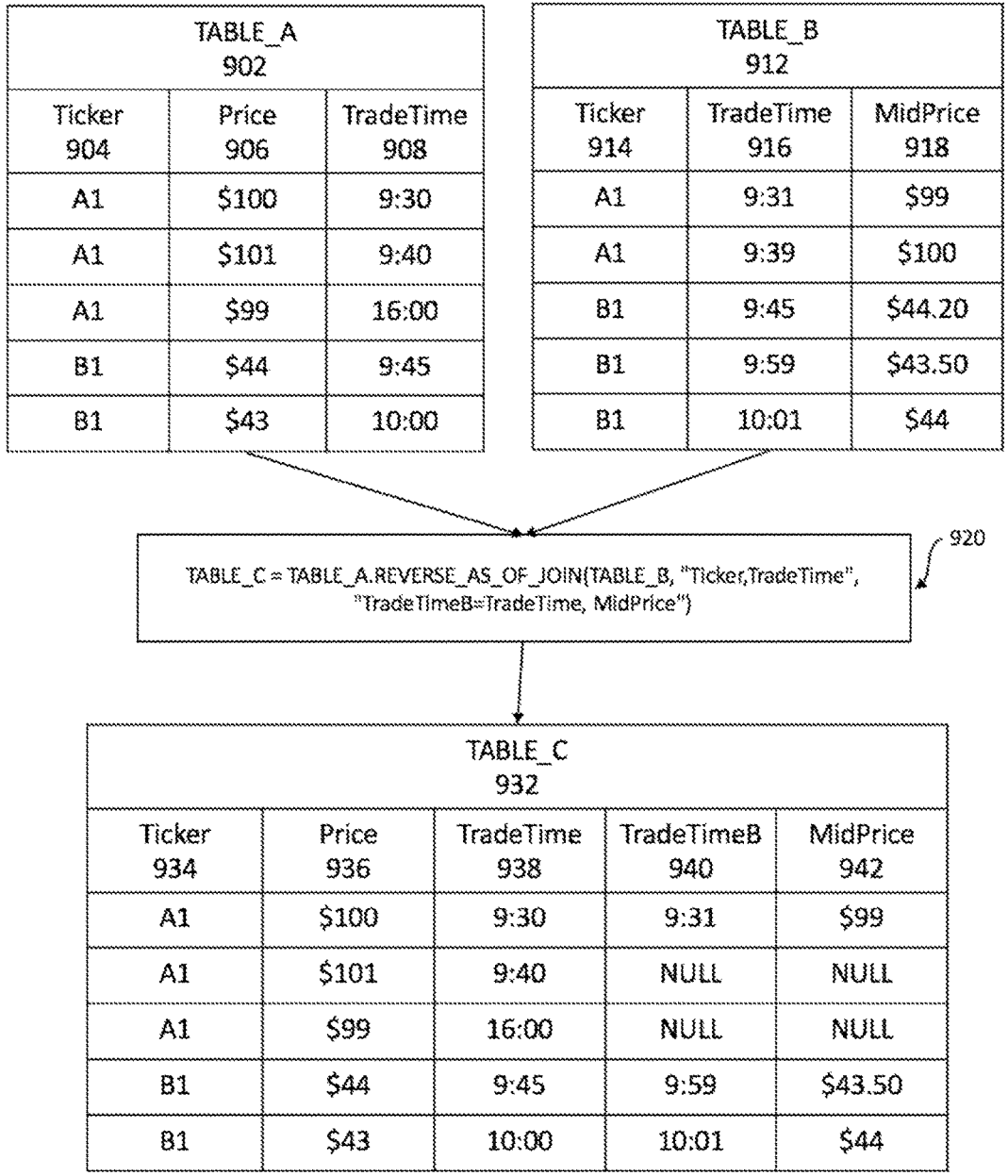
FIG. 9 is a diagram of an example reverse_as_of_join in accordance with some implementations.

FIG. 9 is a diagram of an example reverse_as_of_join in accordance with some implementations, In this example, a join operation can be used on Table_A and Table_B to create Table_C. The join operation in this example is a reverse_as_of_join. An exemplary command string for a reverse_as_of_join can be Table_C=leftTable raj(Table rightTable, String columnsToMatch,String columnsToAdd). The reverse_as_of_join can function as the reverse of the as of join operation. In comparison to the as_of_join operation selecting the previous value, the reverse_as_of_join operation can select the next value. For example, the reverse_as_of_join operation can select the value that is greater than or equal to rather than less than or equal to the timestamp.

In the reverse_as_of_join example shown in FIG. 9, leftTable table_A 902 is reverse_as_of_joined with rightTable tableB 912 with a reverse_as_of_join command 920 that creates the resultant table, table_C 932. In this example, the values for ticker 904, price 906, and tradetime 908 columns from table_A remain the same in table_C 932 as ticker 934, price 936, tradetime 938. The tradetime 916 column from rightTable table_B 912 is renamed in Table_C 932 as tradetimeB 940. The midprice 918 column in table B_912 retains the same column name, midprice 942. In this example, the A1, $101, 9:40 and A1, $99, 16:00 rows in table_A 902 do not have a match in table_B 912 because every time value in tradetime 916 for A1 is less than 9:40. Accordingly, in table_C 932, the tradetimeB 940 and midprice 942 columns contain NULL values for the A1, $101 9:40 and A1, $99, 16:00 rows.

Figure 10:
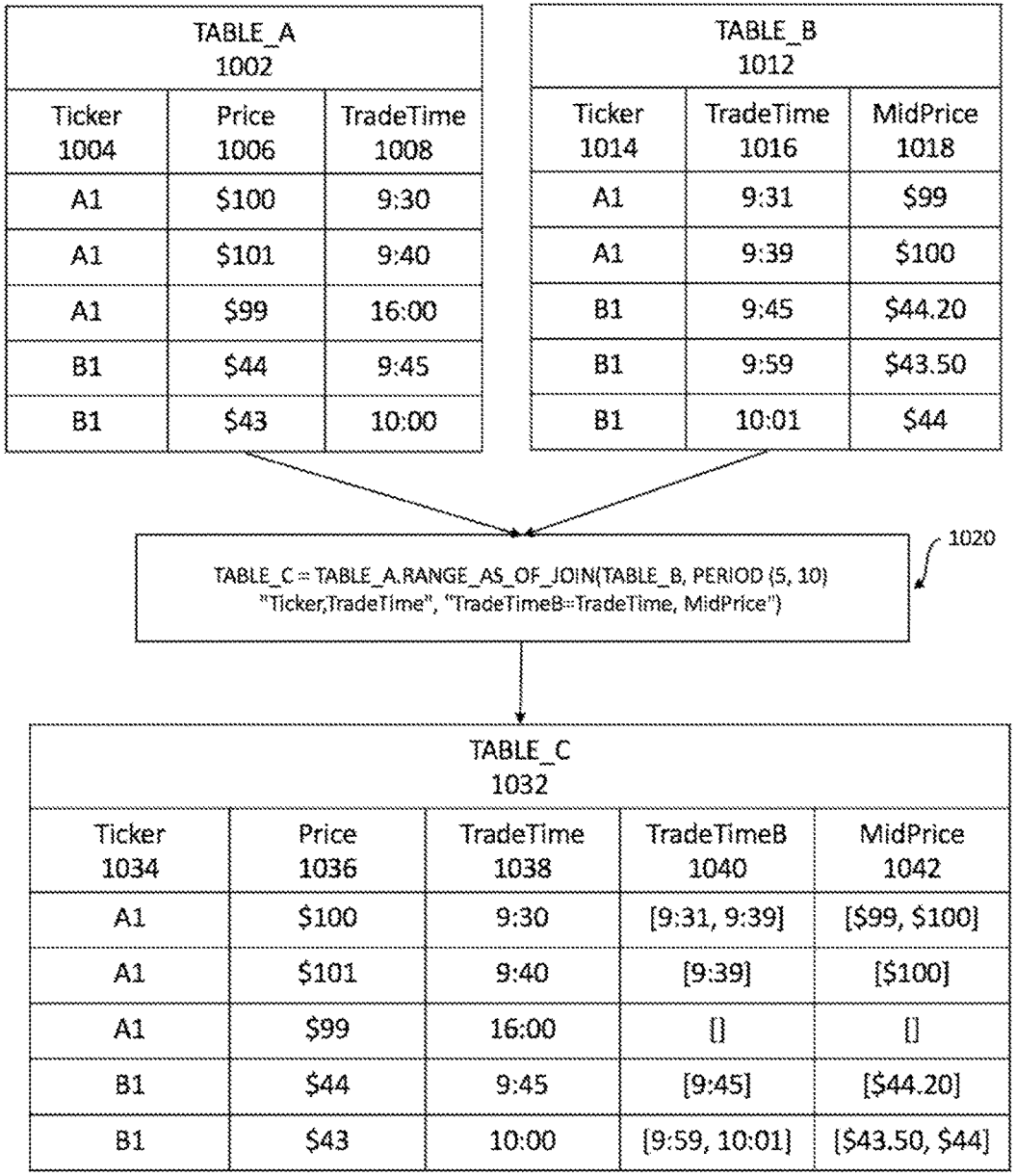
FIG. 10 is a diagram of an example range_as_of_join in accordance with some implementations.

FIG. 10 is a diagram of an example range_as_of_join in accordance with some implementations. In this example, a join operation can be used on Table_A and Table_B to create Table_C. The join operation in this example is a range_as_of_join 1020. The range_as_of_join can be a combination of an as-of-join, a reverse-as-of-join, and a left join, The range-as-of-join can search for a range of rows in a rightTable. There can be several alternatives for specifying the range to be matched in the rightTable. One possible syntax for specifying the range to be matched can be to match columns C1 . . . CN. C1 . . . CN-2 can be exact matches. CN-1 can be a range matching column that indicates the start of the range in the right table, CN can be a range matching column that indicates the end of the range in the rightTable. An exemplary command string for a range_as_of_join can be t3=t1.rangeJoin(t2,"A,B,StartTime=Time, EndTime=Time", "Time,C"), which can create result types such as:

A—AType from t1
B—BType from t1
StartTime—DBDateTime from t1
EndTime—DBDateTime from t1
Time—Array{DBDateTime} from t2
C—Array{CType} from t2

One possible syntax for specifying the range to be matched can be to match columns columns C1 . . . CN with C1 . . . CN-1 being exact matches, CN can be a range matching column. A separate argument can indicate how the range will be computed. The range can be a combination of a time-period (e.g. five minutes before/after), a row count (e.g., 10 rows before), or a formula (e.g., include all prior/ subsequent rows as long as a formula is true).

An exemplary command string for a range_as_of_join can be t3=t1.rangeJoin(t2, "A,B,Time", Period('05:00'), Count (1), "Time2=Time,C"), which can create result types such as:

A—AType from t1
B—BType from t1
Time—DBDateTime from t1
Time2—Array{DBDateTime} from t2
C—Array{CType} from t2

Another exemplary command string for range_as_of_join can be t3=t1.rangeJoin(t2, "A,B,Time", Count('0'), Formula ('C >D'), "Time2=Time,C,D"), which can create result type such as:

A—AType from t1
B—BType from t1
Time—DBDateTime from t1
Time2—Array{DBDateTime} from t2
C—Array{CType} from t2
D—Array{DType} from t2

In this example, the range can include all rows subsequent to Time in t1; until C is not greater than D.

It will be appreciated that an index from a leftTable can be reused, and all leftTable columns can be passed through to the result table, and that rightTable arrays do not need to be stored.

In the range_as_of_join example shown in FIG. 10, leftTable table_A 1002 is range_as_of_joined with rightTable table_B 1012 with a range_as_of_join command 1020 that creates the resultant table, table_C 1032. In this example, the values for ticker 1004, price 1006, and tradetime 1008 columns from table_A remain the same in table_C 1032 as ticker 1034, price 1036, tradetime 1038. The tradetime 1016 column form rightTable table _B 1012 is renamed in Table_C 1032 as tradetimeB 1040. The midprice 1018 column in table_B 1012 retains the same column name, midprice 1042. In this example, the A1, $99, 16:00 row in table_A 1002 does not have a match in table_B 1012 because every time value in tradetime 1016 for A1 is not within the period 5, 10 (5 minutes before to 10 minutes after) range. Accordingly, in table_C 1032, the tradetimeB 1040 and midprice 1042 columns can contain either a NULL value or an empty array for the A1, $99, 16:00 row.

Figure 11:
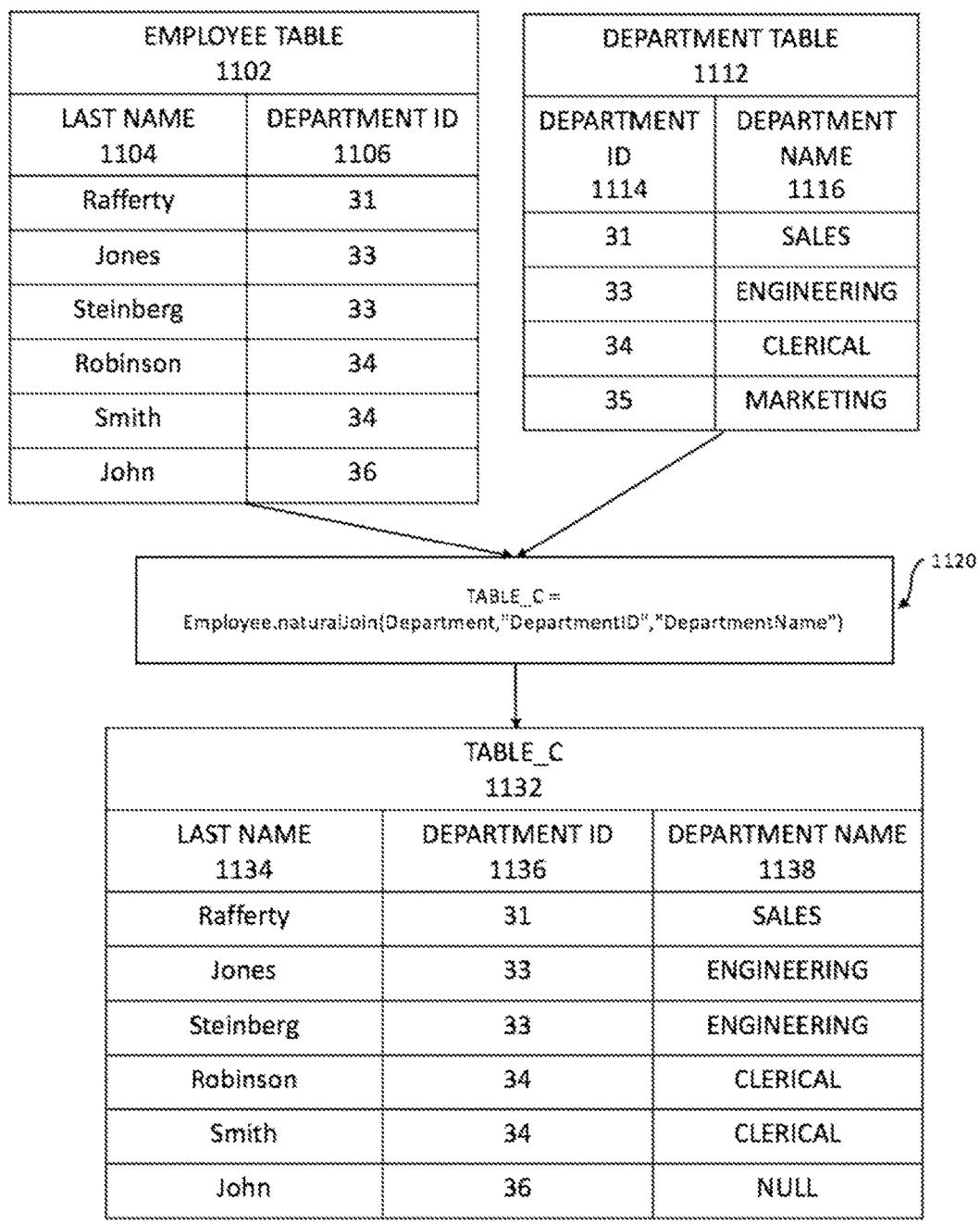
FIG. 11 is a diagram of an example natural_join in accordance with some implementations.

FIG. 11 is a diagram of an example natural_join in accordance with some implementations. In this example, a join operation can be used on Table_A and Table_B to create Table C. The join operation in this example is a natural join 1120. An exemplary command string for an as_of_join can be Table_C=leftTable naturalJoin(Table rightTable,String columnsToMatch,String columnsToAdd). Table_C can have the exact some number of rows as the leftTable with all the columns from the leftTable with the exact original content. The rightTable can be expected to have one or no rows matching the columnsToMatch constraints. ColumnsToMatch can be comma separated constraints, expressed either as columnName (if the names are identical) or columnNameFromA=columnNameFromB. The resulting table, Table_C can contain one column for each column specified by columnToAdd, containing the matching rightTable values or null. ColumnsToAdd can be comma separated columns from B to be added to the final result, expressed either as columnName or newColumnName=oldColumnName when renaming the column is desired or necessary.

Figure 12:
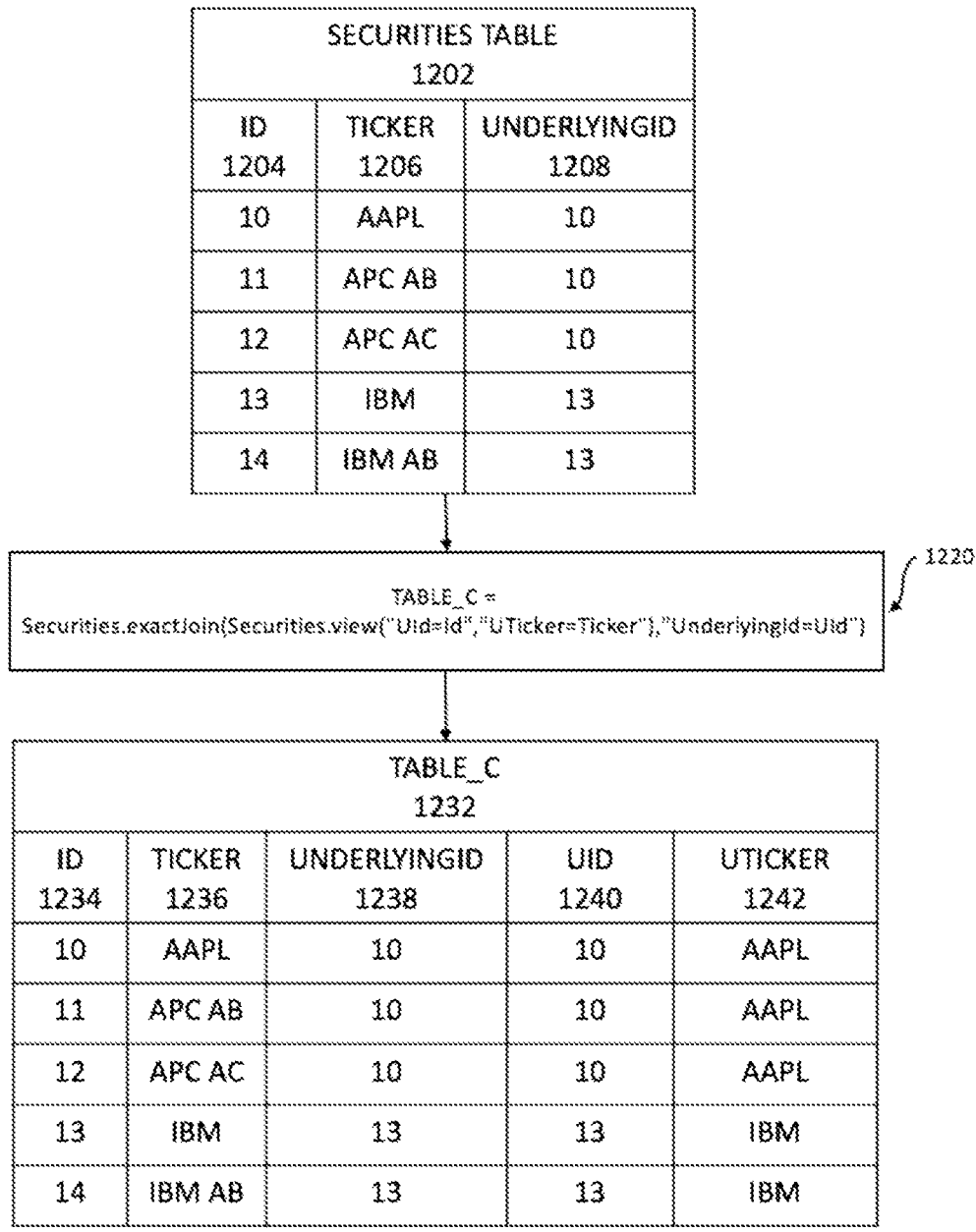
FIG. 12 is a diagram of an example exact_join in accordance with some implementations.

In the natural_join example shown in FIG. 11, leftTable employee table 1102 is natural_joined with rightTable department table 1112 with a natural_join command 1120 that creates the resultant table, table_C 1132. In this example, the values for last name 1104 and department ID 806 from employee table remain the same in table_C 1132. Each of the department ID 1106 values in employee table 1102 have corresponding department ID 1114 values in department table 1112 with the exception of the last row of employee table 1102, "John" and "36". Because a value for "36" does not exist in the department ID 1114 column of the department table 1112, the row for "John" and "36" in table_C has a NULL value for department name 1138, FIG. 12 is a diagram of an example exact join in accordance with some implementations. In this example, a join operation can be used on a securities table 1202 and a view of the securities table to create Table_C 1232. The join operation in this example is an exact_join 1220. An exemplary command string for an as_of_join can be Table_C=leftTable exactJoin(Table table, String columnsToMatche, String columnsToAdd).

An exact_join can function identical to a natural join with the exception that an exact join expects exactly one match for each of its columns with the rightTable.

It will be appreciated that one method to ensure a match for each column is to join a table with a view of itself.

In the exact_join example shown in FIG. 12, leftTable securities table 1202 is exact_joined with a view of securities table 1202 with an exact_join command 1220 that creates the resultant table, table_C 1232. In this example, the underlying ticker symbol 1242 is added to the row containing the ticker 1236 symbol for a derivative product of the underlying ticker symbol 1241.

Figure 13:
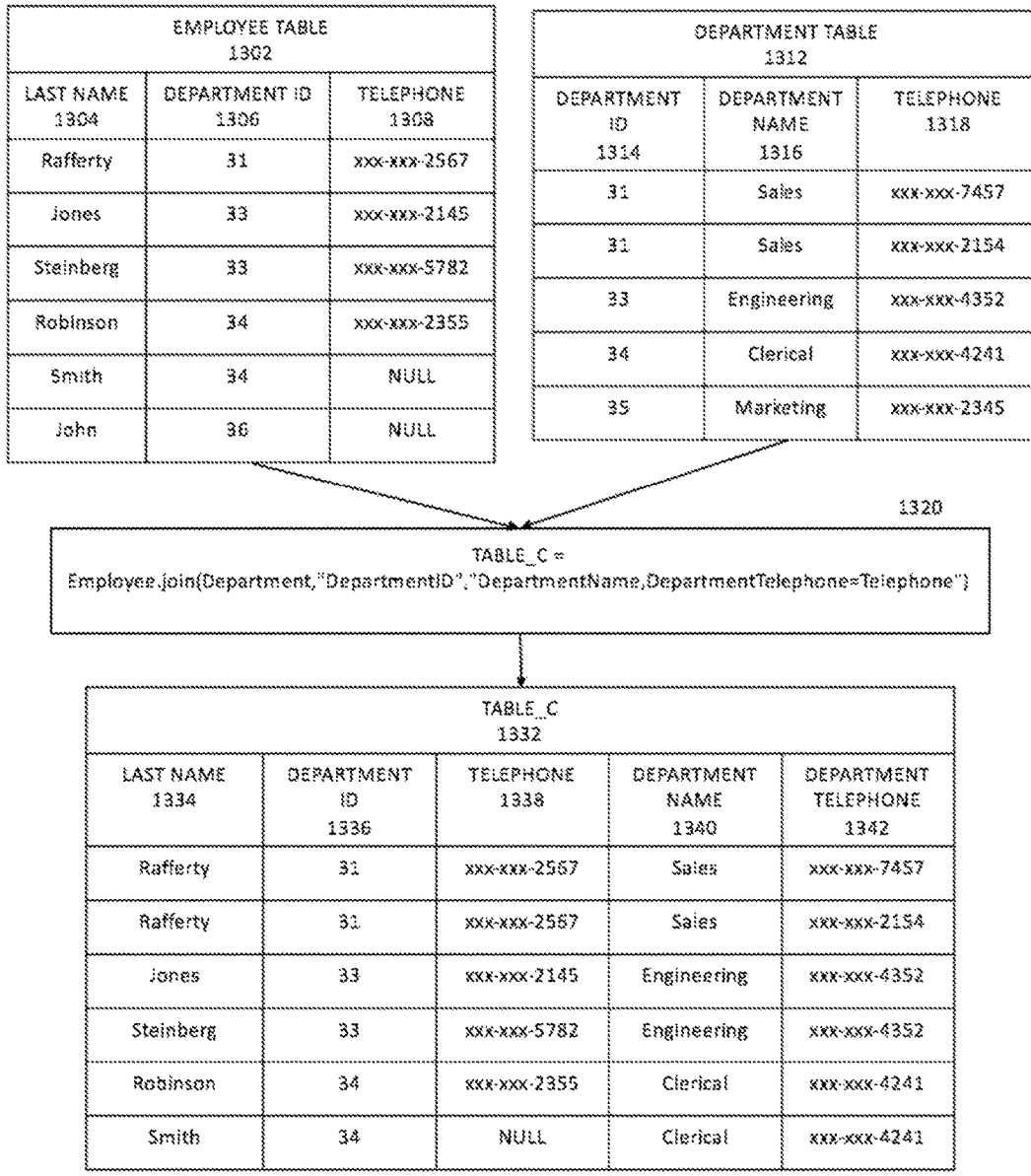
FIG. 13 is a diagram of an example join in accordance with some implementations.

FIG. 13 is a diagram of an example join in accordance with some implementations. In this example, a join operation can be used on Table_A and Table_B to create Table_C. The join operation in this example is a join 1320. An exemplary command string for a join can be table_C=leftTable.join (rightTable, String columnsToMatch, String columnsToAdd), which can return the join of the leftTable with the rightTable. The result can be defined as the outcome of first taking the Cartesian product (or cross-join) of all records in the tables (combining every record in the leftTable with every record in the rightTable, with optional renamings of rightTable columns induced by column-ToAdd)—then returning all records which satisfy the match constraints, with all the columns of leftTable and the columns of rightTable in columnsToAdd as selected columns. ColumnsToMatch can be comma separated contraints, expressed either as columnName (when the column names in leftTable and rightTable are the same) or columnNameFromleftTable=columnNameFromrightTable. ColumnsToAdd can be comma separated columns from rightTable to be added to the final result, expressed either as columnName or newColumnName=oldColumnName when renaming is desired or necessary.

In the join example shown in FIG. 13, leftTable employee table 1302 is joined with rightTable department table 1312 with a join command 1320 that creates the resultant table, table_C 1332, In this example, the values for last name 1304, department ID 1306, and telephone 1308 from employee table remain the same in table_C 1332. Each of the department ID 1306 values in employee table 1302 have corresponding department ID 1314 values in department table 1312 with the exception of the last row of employee table 1302, "John" and "36". Because a value for "36" does not exist in the department ID 1314 column of the department table 1312, a row for "John" and "36" in table_C does not exist because there was no match. Also, because the department table 1312 contains two rows for 31, sales, table C contains two rows for Rafferty for 31 and sales with each row containing a different department telephone number.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), afield programmable gate array (FPGA), graphics processing unit (GPU), or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for the dynamic updating of join operations.

Application No. 15/154,974, entitled "DATA PARTITIONING AND ORDERING" and filed in the United States Patent and Trademark Office on May 14, 2016, is hereby incorporated by reference herein in its entirety as if fully set forth herein.

Application No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application No. 15/154,980, entitled "SYSTEM PERFORMANCE LOGGING OF COMPLEX REMOTE QUERY PROCESSOR. QUERY OPERATIONS" and filed in the United States Patent and Trademark Office on May 14, 2016, is hereby incorporated by reference herein in its entirety as if fully set forth herein.

Application No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application No. 15/154,987, entitled "DYNAMIC FILTER PROCESSING" and filed in the United States Patent and Trademark Office on May 14, 2016, is hereby incorporated by reference herein in its entirety as if fully set forth herein.

Application No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application No. 15/154,998, entitled "DYNAMIC CODE LOADING" and filed in the United States Patent and Trademark Office on May 14, 2016, is hereby incorporated by reference herein in its entirety as if fully set forth herein.

Application No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application No. 15/155,009, entitled "COMPUTER ASSISTED COMPLETION OF HYPERLINK. COMMAND SEGMENTS" and filed in the United States Patent and Trademark Office on May 14, 2016, is hereby incorporated by reference herein in its entirety as if fully set forth herein.

Application No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application No. 10/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A memory-efficient computer system for dynamically updating join operation results, the system comprising:
   a processor;
   a first memory device electronically storing at least a portion of a first original table;
   a second memory device electronically storing at least a portion of a second original table;
   a third memory device electronically storing a join results index resulting from a join operation performed by the processor on the first and second original tables, the third memory device providing faster access than that provided by each of the first memory device electronically storing at least the portion of the first original table and the second memory device electronically storing at least the portion of the second original table;
   a notification listener device associated with the join results index in the third memory device;
   computer readable storage coupled to the processor, the computer readable storage having stored thereon instructions that, when executed by the processor, cause the processor to perform operations including:
      listening, using the notification listener device, for changes to the first and second original tables;
      automatically notifying the notification listener device of a change to one or both of the first and second original tables;
      in response to the notification listener device receiving notification of a change to one or both of the first and second original tables, automatically re-applying the join operation to changed portions of the first and second original tables; and
      without user intervention, automatically updating in real time the join results index stored in the third memory device with results of the automatically re-applying, thereby dynamically updating results of the join operation in the third memory while minimizing access to the first and second memory devices.

2. The computer system of claim 1, wherein:
   the join operation is a left_join resulting in a table that has one column for each of a plurality of columns in a first input table's columns, and one or more new corresponding second input table columns with names that do not overlap or are renamed in order to not overlap with a name of one or more columns from a first input table, the one or more new columns containing an aggregation of all values from the second input table that match a join criteria, and types of all newly created second input table columns not involved in the join criteria being an array of the second input table's column type.

3. The computer system of claim 1, wherein:
   the join operation is a reverse_as_of_join resulting in a table that has one column for each of a plurality of columns in an input table's columns and one or more new corresponding input table columns with names that do not overlap or are renamed in order to not overlap with a name of one or more columns from a source table, the one or more new columns containing all values from the input table that match a join criteria, the join criteria performing an exact match on all match columns except for one last match column of the match columns followed by performing a closest-greater-than match on the last match column.

4. The computer system of claim 1, wherein the join operation is a range_as_of_join resulting in a table that has one column for each of a plurality of columns in a first input table's columns and one or more new corresponding second input table columns with names that do not overlap or are renamed in order to not overlap with a name of one or more columns from a first input table, the one or more new columns containing all values from the second input table that match a join criteria, the join criteria returning each cell in the one or more new columns with an array of all values within a designated range for all match columns except for M match columns of the match columns where the match is exact, and the M match columns define a range match.

5. The computer system of claim 1, wherein:
   the join operation is a natural_join resulting in a table that has one column for each of a plurality of columns in an input table's columns, and one or more new corresponding input table columns with names that do not overlap or are renamed in order to not overlap with a name of one or more columns from a source table, the table having a same number of rows as the source table, the same number of rows containing an original content of the source table rows, and the one or more new columns determined by matching one or more values from the input table with the source table.

6. The computer system of claim 1, wherein:
the join operation creates a subset filtered by a match criteria on a full Cartesian product, resulting in a table that has one column for each of a plurality of columns in an input table's columns and one or more new corresponding input table columns with names that do not overlap or are renamed in order to not overlap with a name of one or more columns from a source table.

7. The computer system of claim 1, wherein the changes include one or more of an add, modify, delete, or re-index.

8. A computer system for dynamically updating join operation results in real time, the system comprising:
a processor;
a first memory device electronically storing at least a portion of a first original table;
a second memory device electronically storing at least a portion of a second original table;
a third memory device electronically storing a join results index resulting from a join operation performed by the processor on the first and second original tables;
computer readable storage coupled to the processor, the computer readable storage having stored thereon instructions that, when executed by the processor, cause the processor to perform operations including:
receiving a communication over a network interface device during a clock cycle;
responsive to receiving the communication, re-applying the join operation during the clock cycle; and
responsive to the re-applying, updating the join results index during the clock cycle, thereby dynamically updating results of the join operation in real time to reflect information contained in the communication received over the network interface device.

9. The computer system of claim 8, wherein the reapplying is applied to changed portions of the original tables and not to unchanged portions.

10. The computer system of claim 8, wherein:
the join operation is a natural_join resulting in a table that has one column for each of a plurality of columns in an input table's columns, and one or more new corresponding input table columns with names that do not overlap or are renamed in order to not overlap with a name of one or more columns from a source table, the table having a same number of rows as the source table, the same number of rows containing an original content of the source table rows, and the one or more new columns determined by matching one or more values from the input table with the source table.

11. The computer system of claim 8,
wherein the join operation is an exact_join resulting in a table that has one column for each of a plurality of columns in an input table's columns and one or more new corresponding input table columns with names that do not overlap or are renamed in order to not overlap with a name of one or more columns from a source table,
the table having a same number of rows as the source table, the same number of rows containing an original content of the source table rows,
the one or more new columns determined by matching one or more values from the input table with the source table, and
the table containing exactly one match for each row with the input table.

12. The computer system of claim 8, wherein:
the join operation creates a subset filtered by a match criteria on a full Cartesian product, resulting in a table that has one column for each of a plurality of columns in an input table's columns and one or more new corresponding input table columns with names that do not overlap or are renamed in order to not overlap with a name of one or more columns from a source table.

13. The computer system of claim 8, wherein the clock cycle is a logical clock cycle.

14. The computer system of claim 8, wherein the clock cycle lasts no more than one second.

15. The computer system of claim 8, wherein the clock cycle comprises multiple processor clock cycles.

16. The computer system of claim 8, wherein the first memory device is different than the second memory device.

17. The computer system of claim 1, wherein the automatically reapplying is only applied to changed portions of the original tables and not to unchanged portions.

18. The computer system of claim 1, wherein the first and second original tables store data in strict order.

19. The computer system of claim 8, wherein the first and second original tables store data in strict order.

20. The computer system of claim 18, wherein the strict order is determined by timestamps.

21. The computer system of claim 19, wherein the strict order is determined by timestamps.

22. The computer system of claim 8, wherein the join operation is re-applied directly to data received over the network interface device, without first storing the received data in a memory device providing slower access than that provided by the third memory device.

23. A computer system comprising:
a processor;
a memory device electronically storing a join results index resulting from a join operation performed by the processor on a first original table and a second original table;
a network interface device; and
computer readable storage coupled to the processor, the computer readable storage having stored thereon instructions that, when executed by the processor, cause the processor to perform operations including:
associating one merged notification listener with both the first and second original tables;
listening, using the merged notification listener, for changes to the first original table and for changes to the second original table;
receiving, at the merged notification listener, a change notification over the network interface device during a clock cycle, the change notification comprising a change to the first original table or the second original table;
after receiving the change notification, re-applying the join operation during the clock cycle by executing the join operation on the change to the first or second original table received over the network interface device; and
responsive to the re-applying, updating the join results index during the clock cycle, thereby dynamically updating results of the join operation to reflect information contained in the change notification received over the network interface device.

24. The computer system of claim 23, the operations further including:
receiving, at the merged notification listener, a second change notification over the network interface device during the clock cycle, the second change notification comprising a change to the second original table, wherein the change to the first original table or the second original table of the change notification is a change to the first original table, and wherein the re-applying includes re-applying the join operation during the clock cycle by executing the join operation on the change to the first original table and the change to the second original table.

25. The computer system of claim 8, wherein:

the join operation is a left_join resulting in a table that has one column for each of a plurality of columns in a first input table's columns, and one or more new corresponding second input table columns with names that do not overlap or are renamed in order to not overlap with a name of one or more columns from a first input table, the one or more new columns containing an aggregation of all values from the second input table that match a join criteria, and types of all newly created second input table columns not involved in the join criteria being an array of the second input table's column type.

26. The computer system of claim 8, wherein:

the join operation is an as_of_join resulting in a table that has one column for each of a plurality of columns in an input table's columns and one or more new corresponding input table columns with names that do not overlap or are renamed in order to not overlap with a name of one or more columns from a source table, the one or more new columns containing all values from the input table that match a join criteria, the join criteria performing an exact match on all match columns except for one last match column of the match columns followed by performing a closest-less-than match on the last match column.

27. The computer system of claim 23, wherein the memory device is different than the computer readable storage.

28. The computer system of claim 8, wherein:

the join operation is a reverse_as_of_join resulting in a table that has one column for each of a plurality of columns in an input table's columns and one or more new corresponding input table columns with names that do not overlap or are renamed in order to not overlap with a name of one or more columns from a source table, the one or more new columns containing all values from the input table that match a join criteria, the join criteria performing an exact match on all match columns except for one last match column of the match columns followed by performing a closest-greater-than match on the last match column.

29. The computer system of claim 1, wherein the notification listener device receives the notification of the change during a clock cycle, and the re-applying and the updating are both performed during that same clock cycle.

30. The array as recited in claim 2, wherein said array is able to reference multiple values.

31. Each cell as recited in claim 4, wherein said each cell is able to reference multiple values.

32. The array as recited in claim 25, wherein said array is able to reference multiple values.

33. The computer system of claim 8, wherein the join operation is a range_as_of_join resulting in a table that has one column for each of a plurality of columns in a first input table's columns and one or more new corresponding second input table columns with names that do not overlap or are renamed in order to not overlap with a name of one or more columns from a first input table, the one or more new columns containing all values from the second input table that match a join criteria, the join criteria returning each cell in the one or more new columns with an array of all values within a designated range for all match columns except for M match columns of the match columns where the match is exact, and the M match columns define a range match.

34. Each cell as recited in claim 33, wherein said each cell is able to reference multiple values.

35. The computer system of claim 1, wherein:

the join operation is an as_of_join resulting in a table that has one column for each of a plurality of columns in an input table's columns and one or more new corresponding input table columns with names that do not overlap or are renamed in order to not overlap with a name of one or more columns from a source table, the one or more new columns containing all values from the input table that match a join criteria, the join criteria performing an exact match on all match columns except for one last match column of the match columns followed by performing a closest-less-than match on the last match column.

36. The computer system of claim 1, wherein the join operation is an exact_join resulting in a table that has one column for each of a plurality of columns in an input table's columns and one or more new corresponding input table columns with names that do not overlap or are renamed in order to not overlap with a name of one or more columns from a source table, the table having a same number of rows as the source table, the same number of rows containing an original content of the source table rows, the one or more new columns determined by matching one or more values from the input table with the source table, and the table containing exactly one match for each row with the input table.

37. The computer system of claim 8, wherein the communication calls for one or more of an add, modify, delete, or re-index.

38. The computer system of claim 8, wherein the third memory device providing faster access than that provided by each of the first and second memory devices.

39. The computer system of claim 23, wherein the join operation is a range_as_of_join resulting in a table that has one column for each of a plurality of columns in a first input table's columns and one or more new array-typed corresponding second input table columns with names that do not overlap or are renamed in order to not overlap with a name of one or more columns from a first input table, the one or more new array-typed columns containing all values from the second input table that match a join criteria, the join criteria returning each cell in the one or more new array-typed columns with an array of all values within a designated range for all match columns except for M match columns of the match columns where the match is exact, and the M match columns define a range match.

40. Each cell as recited in claim 39, wherein said each cell is able to reference multiple values.

* * * * *